United States Patent [19]

Hughes

[11] 3,730,160
[45] May 1, 1973

[54] ENERGIZATION OF THE COMBUSTIBLE MIXTURE IN AN INTERNAL COMBUSTION ENGINE

[75] Inventor: Nathaniel Hughes, Rolling Hills Estates, Calif.

[73] Assignee: Energy Sciences Incorporated, El Segundo, Calif.

[22] Filed: July 1, 1971

[21] Appl. No.: 158,915

Related U.S. Application Data

[63] Continuation-in-part of Ser. No. 855,321, Sept. 4, 1969, abandoned, and a continuation-in-part of Ser. No. 13,977, Feb. 25, 1970, abandoned, and a continuation-in-part of Ser. No. 17,484, March 9, 1970, Pat. No. 3,613,722, and a continuation-in-part of Ser. No. 82,771, Oct. 21, 1970, abandoned, and a continuation-in-part of Ser. No. 111,995, Feb. 2, 1971.

[52] U.S. Cl............123/142, 123/119 A, 123/119 B, 123/52 M, 239/1, 239/4, 261/1
[51] Int. Cl...F02m 27/00, F02m 27/08, F02m 29/00
[58] Field of Search................123/1, 119 R, 119 E, 123/142, 198 E, 52 M, 32 EI, 119 A, 119 B; 261/1; 239/4, 102

[56] References Cited

UNITED STATES PATENTS

| | | | |
|---|---|---|---|
| 1,939,302 | 12/1933 | Heaney | 261/1 |
| 2,436,570 | 2/1948 | Hancock | 123/198 E |
| 2,532,554 | 12/1950 | Joeck | 123/198 E UX |
| 2,704,535 | 3/1955 | Magui et al. | 123/198 E UX |
| 2,732,835 | 1/1956 | Hundt | 123/198 E UX |
| 2,745,372 | 5/1956 | Chertoff | 123/119 E UX |
| 2,791,990 | 5/1957 | Grieb | 123/52 M |
| 2,791,994 | 5/1957 | Grieb | 123/198 E UX |
| 2,908,443 | 10/1959 | Fruengel | 239/102 |
| 3,206,124 | 9/1965 | Drayer et al. | 239/4 X |
| 3,554,443 | 1/1971 | Hughes | 239/4 |

Primary Examiner—Al Lawrence Smith
Attorney—Christie, Parker & Hale

[57] ABSTRACT

Engine vacuum is used to draw a stream of air into the intake system. Some of the energy of this air stream is converted to pressure waves. The flow rate of the air stream is controlled responsive to the mode of engine operation to provide the proper amount of pressure wave energy.

10 Claims, 34 Drawing Figures

Patented May 1, 1973
3,730,160
10 Sheets-Sheet 1
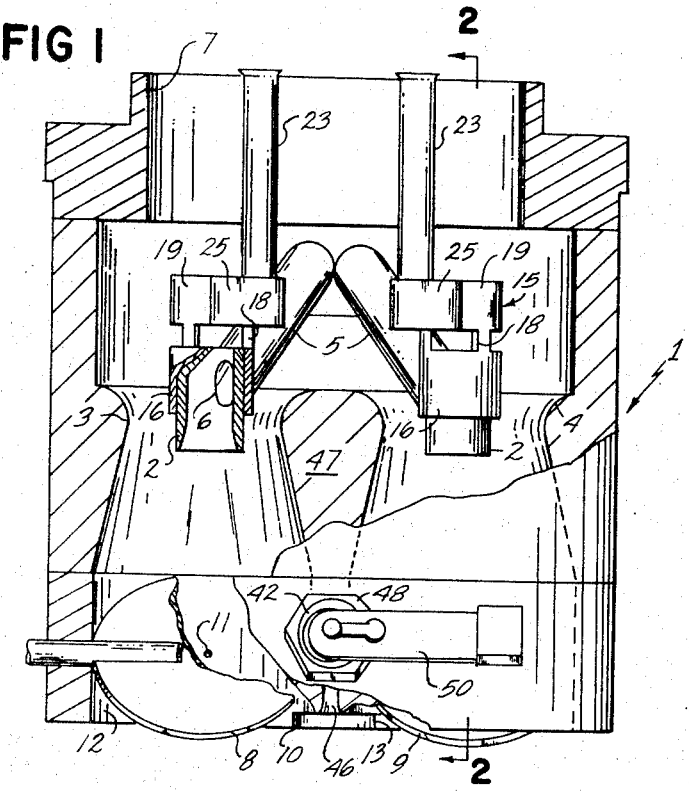
FIG 1
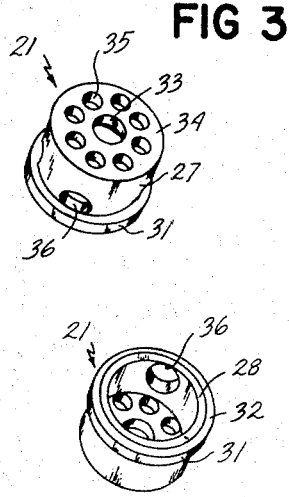
FIG 3
FIG 4
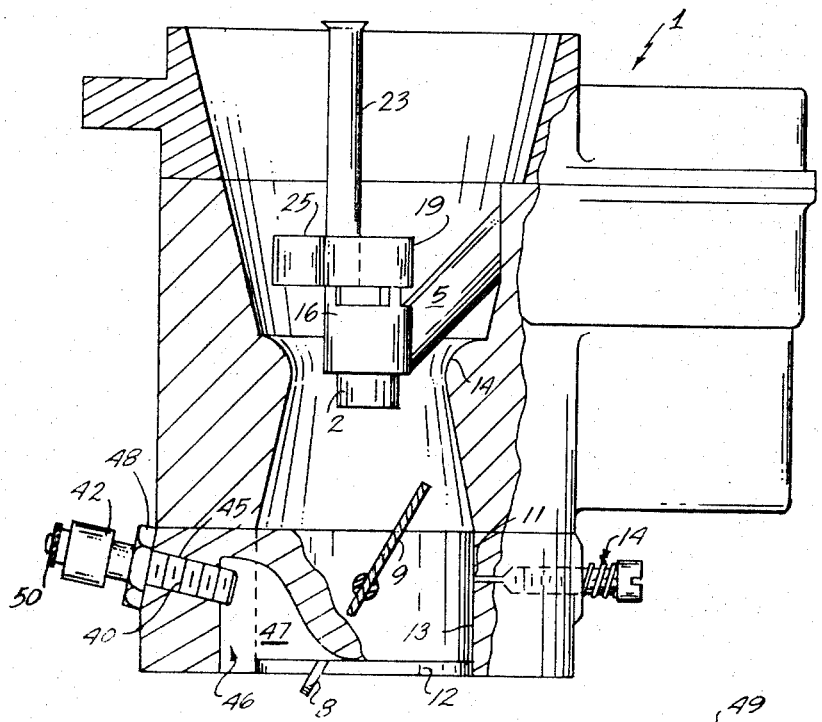
FIG 2
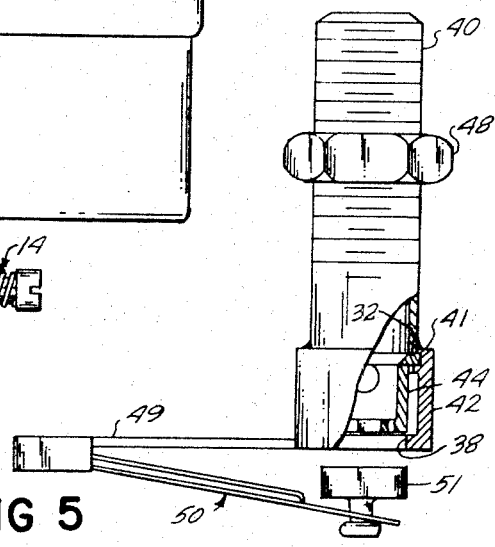
FIG 5
INVENTOR.

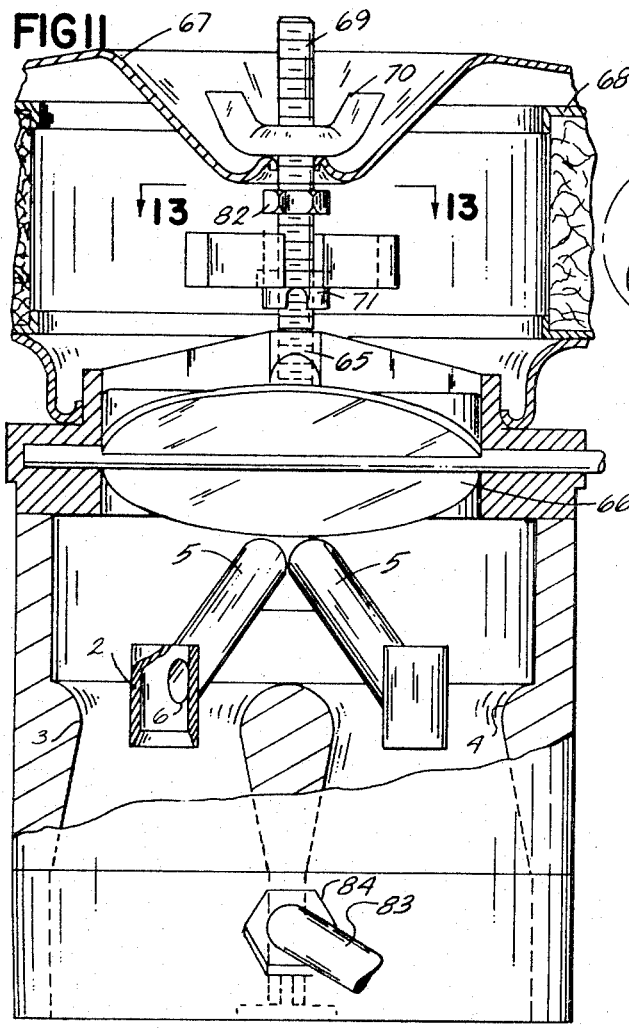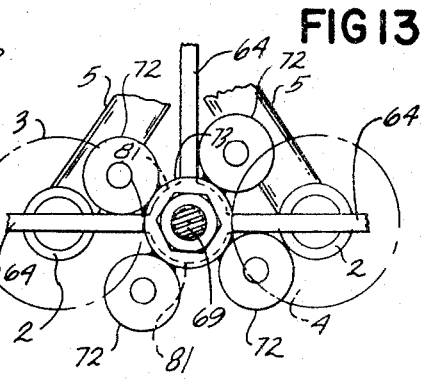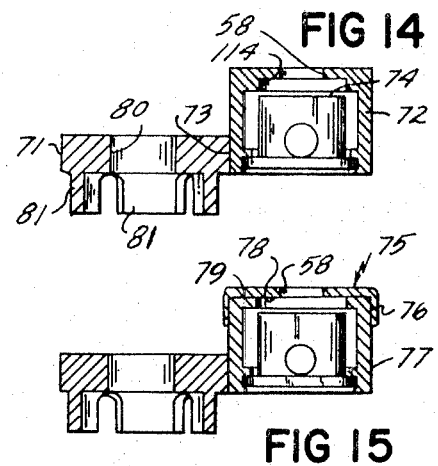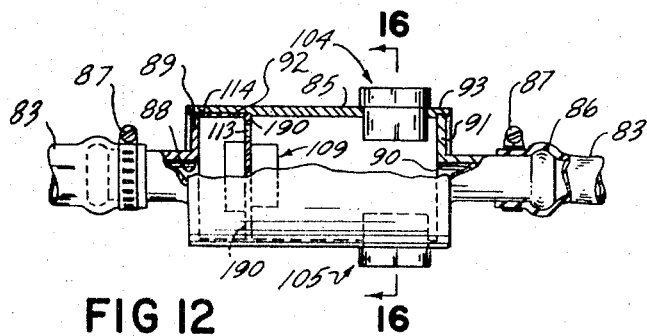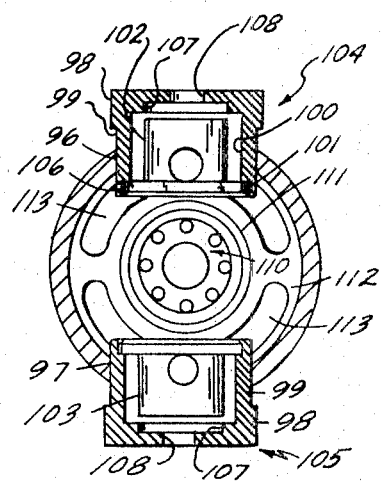

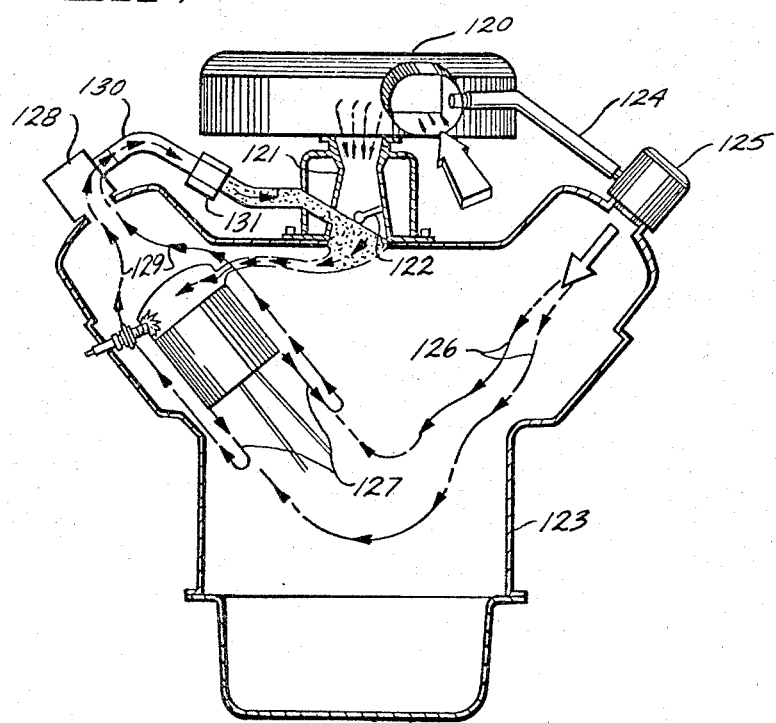

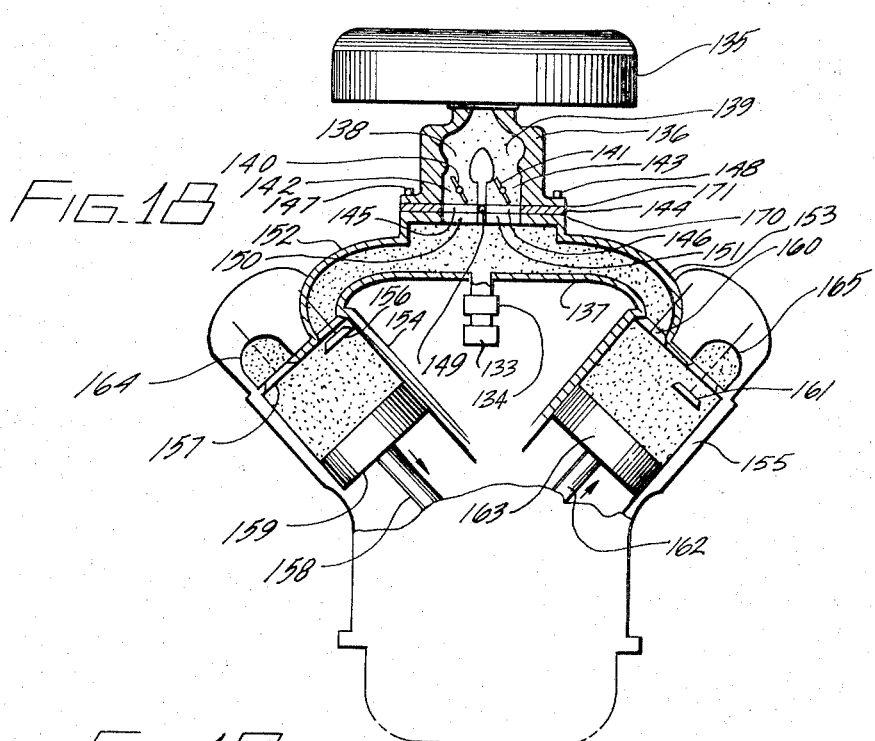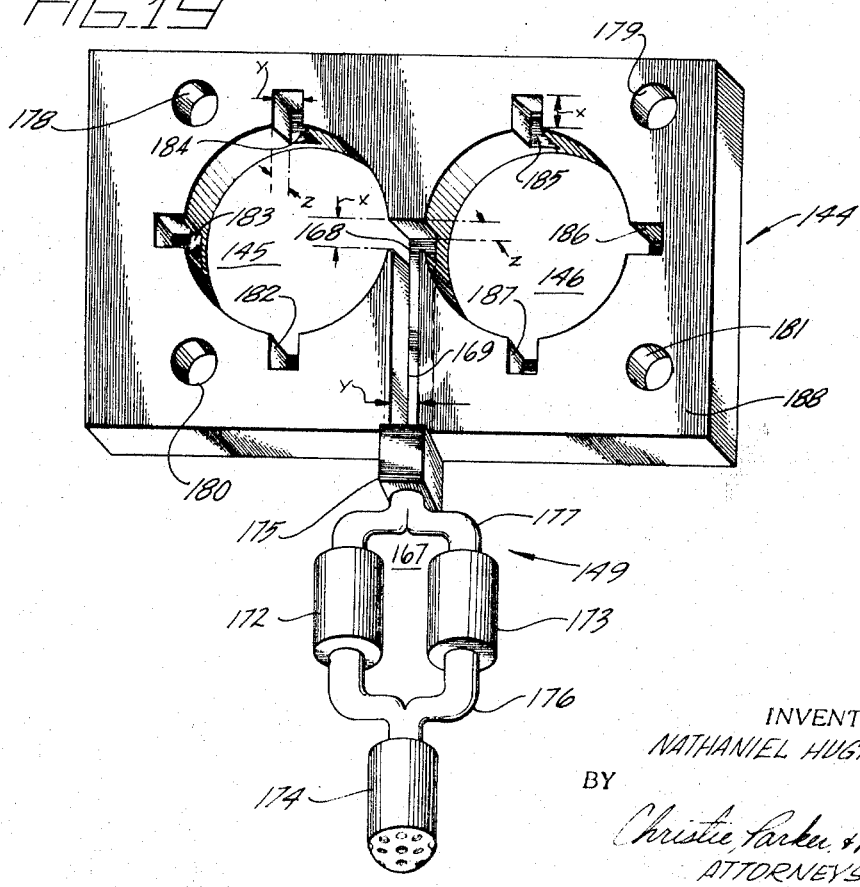

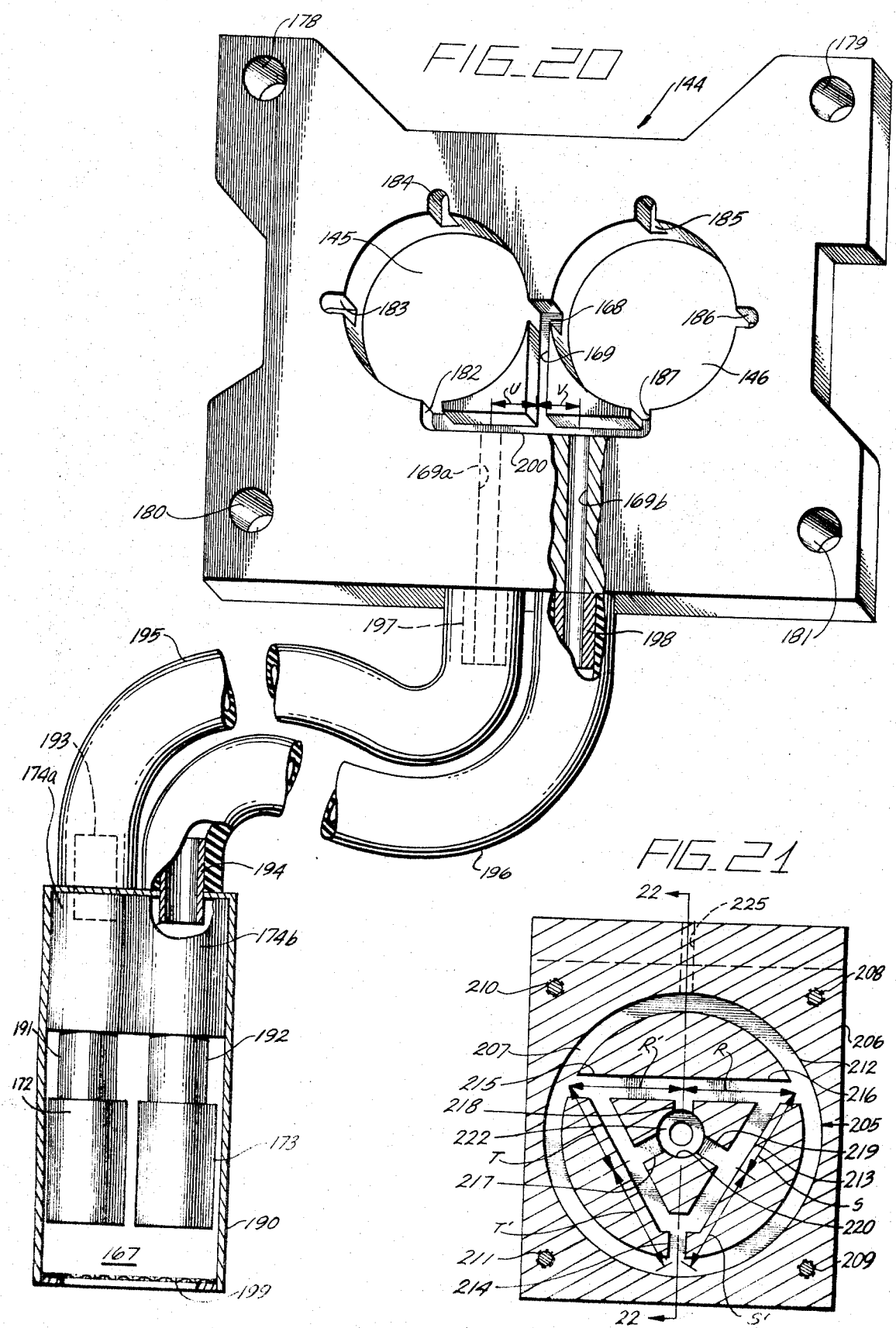

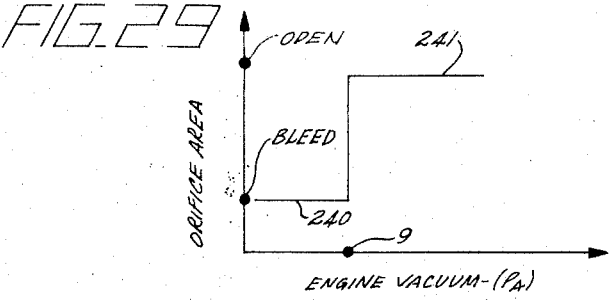
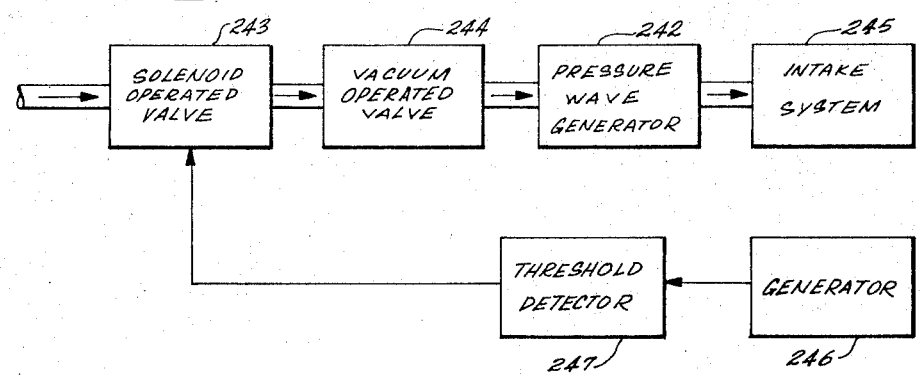
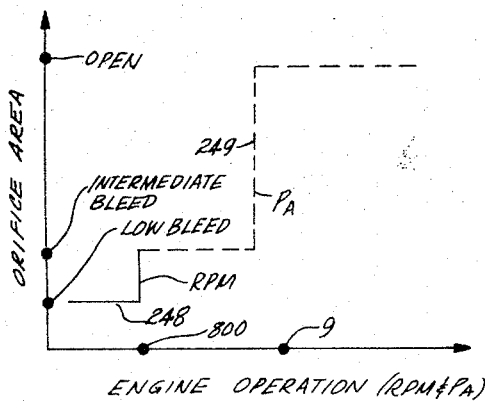
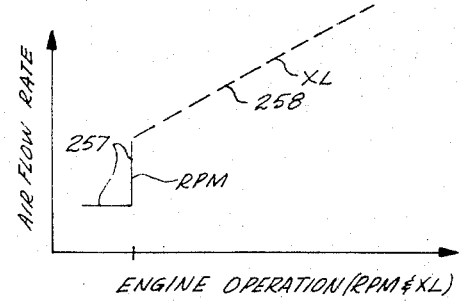

ENERGIZATION OF THE COMBUSTIBLE MIXTURE IN AN INTERNAL COMBUSTION ENGINE

CROSS REFERENCE TO RELATED APPLICATIONS

This is a continuation-in-part of my following copending applications, which are incorporated herein by reference: Ser. No. 855,321, filed Sept. 4, 1969 now abandoned; Ser. No. 13,977, filed Feb. 25, 1970 now abandoned; Ser. No. 17,484, filed Mar. 9, 1970 now U.S. Pat. No. 3,613,722; Ser. No. 82,771, filed Oct. 21, 1970 now abandoned; and Ser. No. 111,995, filed Feb. 2, 1971.

BACKGROUND OF THE INVENTION

This invention relates to the energization of the combustible mixture in an internal combustion engine and, more particularly, to an apparatus for reducing the pollutants, improving the performance, and lessening the fuel consumption of an engine.

Recently, the general public has become keenly aware of the problem of automobile pollution. The pollutants produced by an automobile internal combustion engine are generally classified into three types: carbon monoxide; hydrocarbons; and the oxides of nitrogen. The practical pollution control measures tried to date have been able to reduce to some extent one or two, but not all three, of these types of pollutants. For example, the carbon monoxide and hydrocarbon emissions can be cut by increasing the air-to-fuel ratio up to the point at which complete combustion takes place; however, the corresponding increase in the heat produced in the combustion cylinders raises the level of the oxides of nitrogen. By increasing the air-to-fuel ratio beyond the point of complete combustion, the level of the oxides of nitrogen drops because the additional air cools the combustion cylinders; however, the engine efficiency is impaired by the leanness of the combustible mixture.

The two principle sources of automobile pollution are crankcase emissions and exhaust emissions. Crankcase emissions, which consist of oil droplets and unburned fuel in the form of blowby gases, have been reduced by returning these emissions in a mixture with air to the intake system of the automobile engine for combustion. The standard process for returning crankcase emissions to the intake system is called positive crankcase ventilation (PCV). In a PCV system, one conduit couples the inlet of the carburetor to the crankcase manifold and a second conduit couples the crankcase manifold to the outlet of the carburetor, thereby carrying partially burned products of combustion out of the crankcase manifold for recombustion with the combustible mixture formed in the carburetor. A snap action pressure responsive valve in the second conduit, which bleeds a small amount of the returned mixture to the intake system during idle and cruise, opens fully during acceleration. To some extent, PCV reduces the hydrocarbons and carbon monoxide, but it may in fact increase the oxides of nitrogen produced by the engine. In fact, some of the emissions returned by the PCV system for combustion may eventually find their way into the atmosphere through the exhaust system of the engine. Further, frequent maintenance is required in order to prevent the PCV valve from clogging in the closed position, in which case the PCV system becomes ineffective.

To combat exhaust emissions, either the efficiency of the combustion must be increased or the incompletely burned exhaust gases must be consumed by an afterburner or the like.

Some attempts have been made to atomize the gasoline while in the carburetor so as to achieve more complete burning of the combustible mixture in the engine and thereby to reduce the pollutants produced by the engine. One class of atomizer, of which a spinning disc is typical, employs the engine itself as a source of power to atomize the gasoline. These atomizers are in general so inefficient that in order to atomize the gasoline effectively a substantial portion of the available engine power is dissipated. Therefore, engine performance is unduly impaired. Another class of atomizer employs an electrically powered ultrasonic generator, of which a piezoelectric crystal is typical. In order to atomize the gasoline effectively it must be brought into contact with the surface of the crystal, because of the sharp attenuation of the generated ultrasonic waves. This technique does not take any measures to ensure that the gasoline is maintained in an atomized state until the time of combustion.

Fuel injection has also been employed to reduce automobile pollutants. The equipment needed to achieve significant results is very complex and expensive due to the precise timing required to practice fuel injection.

SUMMARY OF THE INVENTION

According to the invention, the vacuum created by the operation of an engine is used as the source of energy for generating pressure waves. The engine vacuum draws a stream of fluid into the intake system from a fluid source such as the atmosphere. Some of the energy of this fluid stream is converted into pressure waves that propagate throughout the intake system of the engine.

The flow rate of the fluid stream is controlled as a function of the engine mode of operation, e.g., more fluid energy is supplied during acceleration than during idle. The control of the amount of pressure wave energy is most simply accomplished by a pressure responsive valve through which the fluid stream passes into the intake manifold. The valve is open during acceleration and closed except for a bleed orifice during idle, deceleration, or cruise. Further control of the amount of pressure wave energy can be effected by employing an energy conversion device that tends to pass fluid at a flow rate that is directly related to the absolute pressure. Thus, as the absolute pressure in the intake manifold drops, i.e., the vacuum becomes higher, the flow rate and thus the energy conversion decreases.

BRIEF DESCRIPTION OF THE DRAWINGS

The features of numerous specific embodiments of the best mode contemplated of carrying out the invention are illustrated in the drawings, in which:

FIG. 1 is an elevational view, partially broken away, of a conventional automobile carburetor, including embodiments of the present invention;

FIG. 2 is a sectional view of the apparatus of FIG. 1, along line 2—2 thereof, with portions broken away, and the venturi and attached cell shown in elevation;

FIGS. 3 and 4 are enlarged perspective views of a nozzle employed in the embodiments of FIG. 1;

FIG. 5 is an enlarged elevational view, partially broken away, of the idle air assembly of FIG. 1;

FIGS. 11 and 12 constitute an elevational view, partially broken away, of a carburetor, identical to that of FIG. 1, except including, partially assembled thereto in FIG. 11, and attached thereto through a broken-away connector in FIG. 12, still other embodiments of the present invention;

FIG. 13 is an end view of the embodiment of FIG. 11, and pertinent portions of the carburetor;

FIG. 14 is a sectional view of a portion of the embodiment of FIG. 13, showing the construction of the adapter and one of the four identical cells attached thereto;

FIG. 15 is a view like FIG. 14, showing a variant cell construction;

FIG. 16 is a sectional view of the embodiment of FIG. 12, along line 16-16 thereof;

FIG. 17 is a schematic diagram of a PCV system of an internal combustion engine, which illustrates the introduction of pressure wave energy into the intake system of an internal combustion engine through a PCV line;

FIG. 18 is a schematic diagram of the intake system of an internal combustion engine, which illustrates several ways in which sonic wave energy is simultaneously introduced;

FIGS. 19 and 20 are perspective views of alternative apparatus for generating sonic waves;

FIGS. 21 and 22 are, respectively, front and side sectional views of a different type of apparatus for generating sonic waves;

FIG. 29 is a graph of the effective orifice area of a two state air management valve as a function of the engine vacuum;

FIG. 30 is a schematic block diagram of a more effective air management system than a two-state valve;

FIG. 31 is a graph of the effective orifice area of the air management system of FIG. 30 as a function of engine operation;

FIG. 33 is a graph of the air flow rate through the air management system of FIG. 32 as a function of engine operation.

DETAILED DESCRIPTION OF THE SPECIFIC EMBODIMENTS

Figure 7:
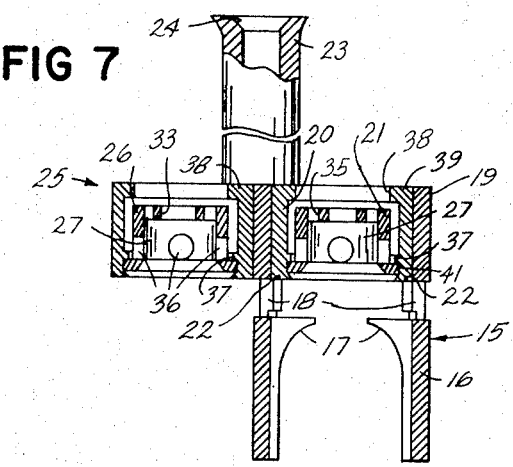
FIG. 7 is a sectional view of the apparatus of FIG. 6, along line 7—7 thereof.

As used in this specification, the term "shock waves" means periodic positive pressure pulses that are predominately unipolar, i.e., the pressure at a given point in space pulsates between ambient pressure and a pressure higher than ambient pressure so compression of the fluid molecules repeatedly occurs, although between the compressive pulses slight negative pressure pulses may occur. "Coherent shock wave energy" consists of shock waves having the same wavelength or a number of component wavelengths that are multiples or submultiplies of each other, i.e., that are multiply related. The term "sonic waves" means periodic bipolar pressure waves, i.e., the pressure at a given point in space sinusoidally oscillates between a pressure higher than ambient and a pressure lower than ambient, so compression and rarification of the fluid modules alternately occur. The term "ultrasonic energy" means sonic wave energy having a frequency above the audible range. "Coherent sonic wave energy" consists of sonic waves having the same wavelength or a number of component wavelengths that are multiply related. The term "coherent pressure waves" is generic to coherent shock waves and coherent sonic waves.

It has been found that the pressure waves produced by the arrangements shown herein have the ability to travel far without substantial attenuation, so they can propagate in the intake system of an engine. They also propagate with a surprising degree of three dimensional uniformity, i.e., they have uniform intensity in the X, Y, and Z dimensions.

Due to the bipolar nature of sonic waves, they produce much higher pressure gradients and, therefore, have greater atomizing power, than a comparable level of shock waves. In contrast to shock waves, the presence of sonic waves also gives rise to a standing wave pattern within a confined space. Moreover, due to the highly ordered nature of coherent waves, they provide the most effective form of energization of the space within the intake system. Hence, the use of coherent sonic waves is the preferred way to practice the invention.

In practice, coherency is not completely destroyed until the wavelengths of the pressure wave components deviate by one-quarter wavelength from their prescribed multiple relationship. The same is true with respect to the relationship between the wavelengths of the pressure waves and the dimensions of the apparatus disclosed below. As a design guide, when the actual dimensional and wavelength relationships are met to within ± 10 percent of the prescribed values, the described results are in fact very effectively achieved. Beyond a ± 10 percent deviation, the effectiveness of the results drops off but may still be significant and usable. Further, to the extent that the beneficial results described herein are still achieved, coherency is also not destroyed by the presence of some pressure wave energy at component wavelengths that are not multiply related to the principle component wavelengths or by the presence of some random pressure wave energy, analogous to background noise.

FIGS. 1 and 2 show a conventional automobile carburetor 1 in which gasoline is supplied, from a reservoir (not shown), to booster venturis 2, mounted at the inlet ends of venturi shaped barrels 3, 4, through fuel conduits 5 and fuel inlets 6, and to which air is supplied generally through air inlet 7. Throttle valves 8, 9 control the rate of supply of fuel/air mixture to an intake manifold beneath, of which only a small portion 10 is shown. Gasoline for engine idling is supplied through idle inlets 11 through the lower cylindrical walls 12, 13 of barrels 3, 4, respectively, at a rate determined by conventional idle screws 14.

Figure 6:
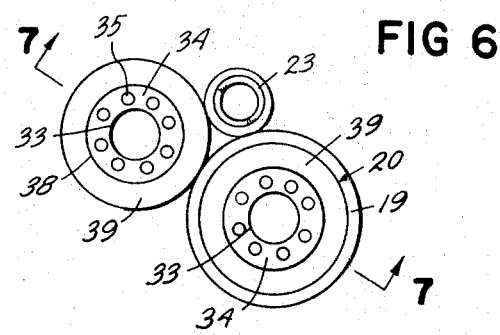
FIG. 6 is an end view of a portion of the apparatus of FIG. 1, disconnected from the carburetor.

In each barrel a retainer 15 is mounted wth collar 16 (outside diameter 0.625 inches, inside diameter 0.565 inches) around the upper portion of venturi 2, the collar being notched at 17 (FIG. 7) to admit fuel conduit 5. Collar 16 is connected through three legs 18 (each 0.130 inches long) to another collar 19 in which is carried tubular cell 20 (FIGS. 6, 7) in turn containing nozzle 21 (FIGS. 3, 4). Legs 18 extend inwardly to provide shelves 22 which support cell 20.

Air tube 23, with 60° countersink 24 at its flared inlet end, is soldered to the exterior of collar 19, and extends from the air inlet 7 of the carburetor to the bottom of collar 19 between two legs 18.

A second cell 25 containing a nozzle 26, respectively identical to cell 20 and nozzle 21, is soldered to collar 19 and tube 23. The axes of nozzles 21 and 26 are parallel to that of tube 23.

The nozzles, cells, tubes, and retainers in barrels 3 and 4 are identical, except that they are arranged as mirror images of each other (as seen in FIG. 1).

Each of nozzles 21 and 26 has a cylindrical wall 27 (outside diameter 0.346 inches, inside diameter 0.260 inches) open at its outlet end across 45° countersink 28, which is surrounded by annular flange 31, having an end wall 32. Axial inlet 33 (diameter 0.177 inches) in end wall 34 is concentric with an imaginary circle (diameter 0.226 inches) containing the centers of eight equally spaced holes 35 (each of diameter 0.0315 inches). Four radial holes 36 (each of diameter 0.093 inches) in wall 27 have coplanar axes spaced 90°.

The nozzle is mounted in cell 20 (largest inside diameter 0.431 inches) with flange 31 tightly swaged in counterbore 41 against flange 37 (inside diameter 0.398 inches). Cell 20 has an inlet hole 38 (diameter 0.345 inches) in end wall 39.

Additional dimensions of the assembly are:

| | |
|---|---|
| Length of cell 20 between downstream of wall 39 and upstream face of counterbore 41 | 0.267" |
| Length of nozzle 21 between wall 34 and countersink 28 | 0.221" |
| Depth of countersink 28 | 0.029" |

Threaded pipe 40 (FIGS. 2, 5) is soldered in the counterbore 41 of another cell 42, identical to cell 20, against the end wall 32 of a nozzle 44, identical to nozzle 21. The other end of pipe 40 is threaded through hole 45 in the carburetor wall opposite to that receiving idle inlets 11, and into cavity 46 which is open to the manifold beneath, and communicates with both barrels 3, 4 under separatory wall 47. Pipe 40 is locked in place with nut 48. Bracket 49 is soldered to cell 42 and carries bi-metallic strip 50, at one end of which is mounted valve plug 51 arranged to seal inlet 38 of cell 42 when strip 50 flexes toward the carburetor from its open (flexed) position of FIG. 5.

In operation, with the engine running, sub-atmospheric pressure in the intake manifold will draw air through inlets 33 and holes 35 and 36 of nozzles 21 and 26, and out of the nozzles across countersinks 28. As described in my U.S. Pat. No. 3,554,443, which issued Jan. 12, 1971, and my U.S. Pat. No. 3,531,048, which issued Sept. 29, 1970, cells 20 and 25 convert a portion of the energy of the fluid stream passing through it into coherent shock wave energy. Fuel drawn through conduits 5 is atomized and mixes with the energized air passing through nozzles 21 and 26, and with additional air entering barrels 3 and 4 through air inlet 7 (only a minor portion of the air passing through barrels of 3 and 4 having actually passed through the nozzles). Cells 20 and 25 are oriented so the major portion of the shock wave energy they produce propagates in the direction of flow of the carburetor air stream.

When valves 8, 9 are closed, the engine will idle, burning fuel supplied through idle inlets 11. The passage of air through cell 42 and nozzle 44 in the manner described above for cells 20 and 25, will atomize idle fuel in mixing therewith in the intake manifold beneath cavity 46, thereby reducing emissions even under idling conditions. Cell 42 is oriented so the major portion of the shock wave energy it produces propagates in the direction of flow of the air stream drawn through pipe 40 by the subatmospheric pressure in the intake manifold. When the air stream reaches cavity 46 the shock waves are released and propagate in the intake manifold in a direction transverse to the carburetor flow stream. The transverse shock wave propagation synergistically reacts with the shock wave propagation in the direction of the carburetor flow stream to enhance the atomization process. In the embodiment of FIGS. 1–7, at low temperatures bi-metallic strip 50 will remain unflexed to prevent air flow through cell 42, so that raw fuel will reach the cold engine, as is desirable for engine starting.

The combustible air/fuel mixture, energized in the described manner, passes to the engine for combustion, which has been found to be more complete, with less exhaust emission of carbon monoxide and unburned hydrocarbons, than when the same carburetor is operated under the same conditions but without the nozzles. For example, a 1969 Oldsmobile carburetor, with and without the embodiments of FIG. 1, was tested according to the federal exhaust emission test set forth in the Federal Register, Vol. 33, No. 108, Part I (June 4, 1968). The results were an average (weighted) decrease in CO (percent of emissions) from 1.2 percent to 0.44 percent, and an average (weighted) decrease in hydrocarbons (ppm hexane in emissions)

from about 180 ppm to 142 ppm. At idle, the CO was reduced from about 1 percent or greater to 0.6 percent (cold start) and 0.2 percent (hot start), and hydrocarbons from about 180 ppm to 164 ppm (cold start) and 90 ppm (hot start).

Figure 8:
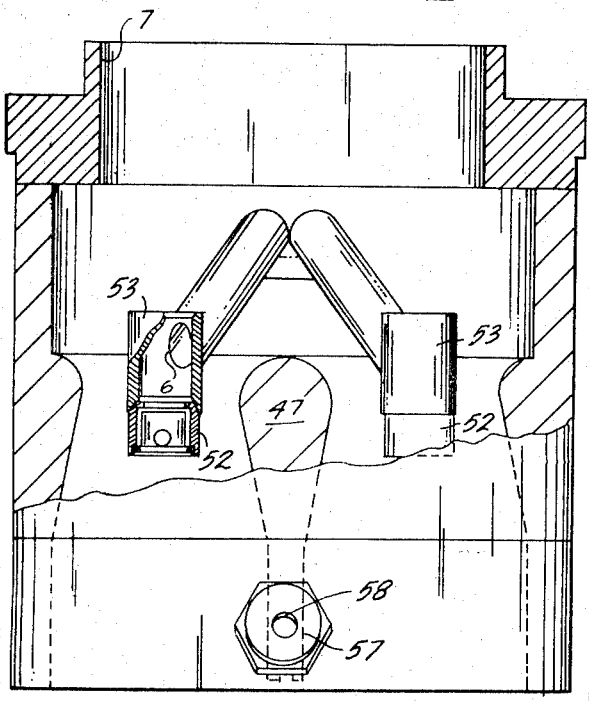
FIG. 8 is an elevational view, partially broken away, of a carburetor identical to that of FIG. 1, except including different embodiments of the present invention.
Figure 9:
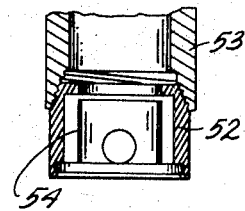
FIG. 9 is an enlarged sectional view of a portion of the apparatus of FIG. 8.
Figure 10:
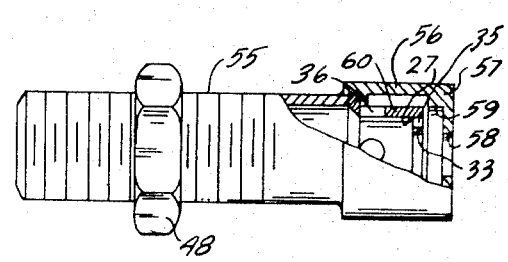
FIG. 10 is an enlarged elevational view, partially broken away, of the idle air assembly of FIG. 8.

FIGS. 8–10 show a conventional automobile carburetor, identical to that of FIGS. 1 and 2, in which cells 52 are threaded and thereby secured into the underside of threaded venturis 53, cells 52 being otherwise identical to cell 20 and venturis 53 being otherwise identical to venturi 2. Cell 52 contains a nozzle 54 identical to nozzle 21. Threaded pipe 55 is soldered in the counterbore of cell 56, which is identical to cell 20 except that end wall 57 has been thickened to provide a stepped axial inlet formed of an outer inlet hole 58 (diameter 0.172 inches) in addition to an inner inlet hole 59 (diameter 0.345 inches), the diameter (0.260 inches) of the axial passage defined by wall 27 being therebetween. Cell 56 contains a nozzle 60 identical to nozzle 21 and threaded pipe 55 extends through a hole into cavity 46, in the same manner as described for pipe 40. Emission reductions similar to those obtained for nozzle 44 of pipe 40 are obtained for nozzle 60.

In operation, fuel through an idle inlet, such as inlet 11 of FIGS. 1, 2, is atomized by air entering through cell 56, in the same manner as described above for cell 42. Air from inlet 7 and venturis 53 and fuel from inlet 6 both pass through nozzle 54, the fuel being atomized and mixing with additional air from inlet 7. As in the embodiment of FIGS. 1–7, the shock waves propagate in the direction of the carburetor flow stream and in the direction transverse thereto to energize the combustible mixture in the intake system. When tested, utilizing a Clayton Dynamometer to measure engine speed and a Lyra Gauge to measure tailpipe emissions, a 1969 Oldsmobile carburetor equipped with cells 52 showed an emissions reduction in CO (hot start) from 1.2 percent to 0.45 percent, and in hydrocarbons from 180 ppm to 87 ppm.

FIGS. 11–16 show a conventional automobile carburetor identical to that of FIGS. 1, 2, and 8, and including, additionally, supporting bars 64 forming a tripod for supporting threaded slug 65, and a rotatable choke valve 66. A conventional automobile air filter 67, having a conventional annular filter element 68, is secured by threaded bolt 69 and wing nut 70 on top of bars 64.

Adapter 71 has four cells soldered, at equal spacing, to its peripheral wall 73, each cell 72 being substantially identical with a cell 56, shown in FIG. 10, and including a nozzle 74, identical with nozzle 21. Alternately, four tubular cells 75 are employed, identical to cells 72 except that inlet 58 of cell 72 is now located in a separate cap element 76, which is press fitted around outer cylindrical wall 77. The interior wall surface 78 of cap 76 may be slightly spaced from the end wall surface 79 of wall 77.

Adapter 71 has an axial opening 80 sized to fit slidingly over bolt 69, and four depending, equally spaced, arcuate spacer legs 81, spaced to straddle supporting bars 64 (FIG. 13), thereby preventing rotation of adapter 71, and orienting cell 72 to produce air flows intercepting barrels 3, 4. A nut 82 tightens the adapter against slug 65. The adapter and nut have been rotated up bolt 69 in FIG. 11, so that the pieces may be more readily identified.

In FIG. 12, a conventional rubber hose oil gallery return line 83 (shown broken for purposes of illustration only) communicates at one end with cavity 46 in the interior of the carburetor through an opening thereinto and an appropriate pipe (not shown, but similar to pipe 40) and nut 84, and at its opposite end with oil droplets which are returned to the carburetor for combustion. A cylincrical tube 85 (outer diameter 1 inch, inner diameter 0.870 inches), secured to return line hose 83 by protuberances 86 and clamps 87, includes an axial inlet 88 (diameter 0.312 inches) through inlet cap 89 and an identically sized axial outlet 90 through outlet cap 91. Caps 89, 91, are tightly fitted in counterbores 92, 93, respectively, of tube 85 which is swaged about the outer walls of the end caps, as shown in FIG. 12.

Tubular cells 104, 105, are located 180° apart in radial bores 96, 97 (diameters 0.515 inches), respectively, in tube 85 and each has a cylindrical wall 98 (outer diameter 0.531 inches), including a reduced outer diameter (0.518 inches) cylindrical portion 99, press-fitted into bores 96, 97, respectively. Inner wall 100 (diameter 0.431 inches) has a counterbore 101 (diameter 0.470 inch) and nozzles 102, 103 are mounted in cells 104, 105, respectively, with flange 106 (outer diameter 0.468 inch) secured in counterbore 101 by swaging of the end of the wall forming counterbore 101. Except for the enlarged diameter of flange 106, nozzles 102, 103 are otherwise identical to nozzle 21. Tubular cells 104, 105 each include a stepped inlet coaxial with inlet 33 to nozzles 102, 103 and formed on an inner inlet 107 (diameter 0.345 inch) and an outer inlet hole 108 (diameter 0.125 inch).

Tubular cell 109, which is identical with tubular cell 104, and contains a nozzle 110, identical with nozzle 102, is tightly secured in a central opening 111 (diameter 0.515 inch) of mounting plate 112, which has arcuate air passages 113, and is seated in counterbore 92, being spaced therein from inlet cap 89 by spacer ring 114.

Additional dimensions of the assembly are:

| | |
|---|---|
| Length of tube 85 | 1.875'' |
| Length of counterbore 92 | 0.422'' |
| Length of counterbore 93 | 0.056'' |
| Distance between center of radial bore 96 or 97 and outer edge of counterbore 93 | 0.400'' |

Cylindrical tube 85, with mounted cells 104, 105, and 109, may also be used in combination with embodiments of FIGS. 1–10, in lieu of idle air pipes 40, 55 and cells 42, 56, whereas the air filter-mounted cells 72 (or 75) would not preferably be combined with the venturi-mounted cells of FIGS. 1–10, although they could be combined with the idle air pipes and cells of FIGS. 1–10.

In operation, with the engine running, sub-atmospheric pressure in the manifold will draw a portion of the air drawn through air filter 67 into inlets 58, 59 of cells 72 or 75, and nozzles 74, out of nozzles 74 to the carburetor barrels 3, 4, the cells being oriented about adaptor 71 to direct the maximum possible air flow to the open throats of barrels 3, 4. By placing the cells in air filter or cleaner 67, the air is energized before it enters carburetor 1 so atomization may have more time to take place. The energized air flows through and around booster venturis 2, and the resulting energized air/fuel mixture then flows to the engine for combustion. A 1969 Chevrolet Impala carburetor showed a reduction in emissions from 1.65 percent to 0.35 percent CO and from 230 ppm to 120 ppm hydrocarbon (emissions measured on a Lyra Gauge), at 15 mph (measured on a Clayton Dynamometer), when equipped with the cells of FIG. 11.

In addition, where cylindrical tube 85 is also used (or where it is used in lieu of the air filter-mounted tubular cells), an oil droplet-air mixture, under sub-atmospheric manifold pressure, is drawn through return line 83, and into cylindrical tube 85 through axial inlet 88 and through cell 109 and air passages 113. At the same time a small amount of atmospheric air is drawn through cells 104, 105 at right angles to the oil-air flow from inlet 88. The combined flow exits through axial outlet 90 and is subsequently fed directly to intake manifold 10 through hole 45 and cavity 46 (FIG. 2) to the engine for burning. As the oil droplet-air mixture flows through tube 85, coherent shock waves are formed and the mixture becomes energized. Due to their coherency, the shock waves travel through return line 83 to intake manifold 10 intact and without substantial attenuation, even with long hose lengths. When the shock waves reach the intake manifold, they are released and propagate transverse to the direction of the carburetor flow stream with which they react in the same manner as the shock waves produced by cell 42 in FIG. 2. A 1965 Dodge Polora showed a reduction in emissions from 1.15 percent to 0.09 percent CO, and from 150 ppm to 80 ppm hydrocarbon (measured in a Lyra Gauge) at 30 mph (measured on a Clayton Dynamometer), when equipped with the embodiment of FIG. 12.

In all of the above embodiments, the size of the axial inlet to the cell utilized depends, among other considerations, on the weight flow of fluid required across the portion of the engine where the cells are located. For example, where a certain fuel-dispensing air flow is referred to (as across a booster venturi), larger cell openings are utilized.

In FIG. 12, a shock wave generator housed in tube 85 is disposed in an oil gallery return line, commonly called a PCV (positive crankcase ventilation) return line. FIG. 17 elaborates upon this manner of introducing pressure wave energy into the intake system of an internal combustion engine. The engine includes an air cleaner 120, a carburetor 121 with a butterfly throttle valve 122, and a crankcase manifold 123. The combustible crankcase emissions produced in the course of the operation of the engine comprise blowby gases, i.e., incompletely combusted substances that escape from the combustion cylinders via the piston rings, and oil particles that become suspended in the air within the crankcase manifold. The PCV system returns these crankcase emissions to the intake system, at the base of the carburetor as shown or at the inlet of the intake manifold, for recombustion in the engine. Clean air is coupled from cleaner 120 by a connecting hose 124 to the crankcase manifold through an oil filler cap 125. This clean air, represented by arrows 126, mixes with and carries the blowby gases, represented by arrows 127, out of crankcase manifold 123 through a PCV valve 128 as represented by arrows 129. PCV valve 128 is coupled to the intake system by a connecting hose 130, which serves as the PCV, i.e., oil gallery, return line. A pressure wave generator 131 is connected in series with hose 130. The described PCV system is conventional. The only modification that is desirable is to provide a spring having a smaller spring constant for PCV valve 128. This enables PCV valve 128 to operate normally, i.e., to close during idling, deceleration, and cruise, and to open during acceleration, despite the smaller pressure drops that have found to exist in the presence of a pressure wave generator. However, it should be noted that the PCV valve performs an additional function, namely, that of controlling the amount of pressure wave energy introduced into the intake system. In other embodiments described below, these functions are performed by a valve that is part of an air management system. To install pressure wave generator 131, hose 130 is simply cut and the two ends formed by the cut are joined to the respective fittings of pressure wave generator 131.

As the mixture of combustible crankcase emissions and air passes through pressure wave generator 131, this mixture is energized, thereby becoming directly atomized. In addition, the pressure waves propagate into the intake system, as represented by the dots between pressure wave generator 131 and carburetor 121, and atomize indirectly the combustible mixture entering the intake manifold from the carburetor. This indirect atomization is particularly effective when pressure wave generator 131 is a sonic wave generator that produces coherent sonic wave energy. Exemplary apparatus is disclosed in application Ser. No. 111,995. In such case, the coherent sonic waves propagate into the intake system in an orderly fashion transverse to the carburetor flow stream to form a standing wave veil across the outlet of carburetor 121 through which the combustible mixture formed in the carburetor must pass before entering the intake manifold. The standing waves also extend into the intake manifold. The result is that the combustible mixture from the carburetor is finely atomized. Although a shock wave generator is also an effective pressure wave generator, it is not as efficient as a coherent sonic wave generator. After the transversely propagating shock waves enter carburetor 121, they are reflected haphazardly from the first obstruction in their path and then dissipate. Thus, their range and effectiveness are substantially less than coherent sonic waves. Different configurations of shock wave generators are disposed in return lines in applications Ser. No. 13,977 and Ser. No. 17,484, the disclosures of which are incorporated herein by reference at this point of the present specification.

In FIG. 18, coherent sonic wave energy is introduced into the intake system of an internal combustion engine in several different ways. An air cleaner 135 is mounted above a carburetor 136 in communication with its inlet. Carburetor 136 is mounted on an intake manifold 137. All the air drawn into carburetor 136 through air cleaner 135 is processed by a sonic wave generator disposed inside the filter element of air cleaner 135. This sonic wave generator, not illustrated in FIG. 18, is described below in connection with FIG. 24. For the purpose of illustration, carburetor 136 is represented as a dual carburetor having two barrels defined by constricted regions 138 and 139 and two butterfly throttle valves 140 and 141 that control the extent to which carburetor outlet orifices 142 and 143 are open. A flat metal plate 144 having openings 145 and 146 is clamped between carburetor 136 and manifold 137 by carburetor mounting fasteners 147 and 148. A schematically represented sonic wave generator 149, discussed in detail in connection with FIG. 19, is attached to plate 144, to introduce coherent sonic wave energy at the interface between carburetor 136 and intake manifold 137. Manifold 137 has inlet orifices 150 and 151. Openings 145 and 146 of plate 144 are the same size and shape as inlet orifices 150 and 151, respectively, of intake manifold 137, as depicted in FIG. 18. As further depicted in FIG. 18, orifice 142, opening 145, and orifice 150 are all axially aligned with each other, and orifice 143, opening 146, and orifice 151 are all axially aligned with each other to present unobstructed passages for the combustible mixture formed in carburetor 136. Manifold 137 has runners such as those designated 152 and 153 that connect manifold 137 with the combustion cylinders of the engine such as those designated 154 and 155. Cylinder 154 is shown during its intake stroke in which an intake valve 156 is open, an exhaust valve 157 is closed, and a piston rod 158 is drawing a piston 159 downward. Cylinder 155 is shown during its exhaust stroke in which an intake valve 160 is closed, an exhaust valve 161 is open, and a piston rod 162 is pushing a piston 163 upward. An exhaust manifold has runners such as those designated 164 and 165 that communicate with cylinders 154 and 155, respectively, through exhaust valves 157 and 161, respectively. A schematically represented sonic wave generator 133 is coupled by an air management valve 134 to intake manifold 137 at a point central to the intake valves of all the combustion cylinders.

All the described components are conventional parts of an internal combustion engine except from the sonic wave generator disposed in air cleaner 135, plate 144, sonic wave generator 149, and sonic wave generator 133. First, the effect of sonic wave generator 149 will be described, assuming for that purpose the sonic wave generator in air cleaner 135 and sonic wave generator 133 are not present. Sonic wave generator 149 produces coherent sonic wave energy that initially propagates across openings 145 and 146 in a direction parallel to the plane of plate 144, i.e., horizontally, as viewed in FIG. 18, to form standing waves across openings 145 and 146, the sonic wave energy produced by sonic wave generator 149 propagates from openings 145 and 146 downstream into manifold 137 and enters the combustion cylinders including cylinders 154 and 155 each time the respective intake valves are opened. Consequently, standing waves, represented by the dots in FIG. 18, are also formed in manifold 137 and in the combustion cylinders. As represented by the dots in cylinder 155 and runners 164 and 165, the standing waves even survive the combustion process to some extent and are pushed into the exhaust manifold during the exhaust stroke. To a lesser extent, the sonic wave energy also propagates upstream into carburetor 136 to form attenuated standing waves, as depicted by the dots in the interior of carburetor 136. The higher concentration of dots in manifold 137 and combustion cylinders 154 and 155 than in carburetor 136 signifies the standing sonic waves are much stronger in the former than in the latter.

The standing sonic waves intercept the combustible mixture as its enters inlet orifices 150 and 151 of manifold 137 to atomize the combustible mixture into a more finely suspended state, which is maintained throughout manifold 137 and the combustion cylinders by the standing waves formed therein. The high degree of atomization brought about by the standing sonic waves permits a more complete and efficient burning of the combustible mixture in the engine. As a result, a lower level of carbon monoxide and hydrocarbons is emitted by the engine, and more carbon dioxide is produced. The reduction in the hydrocarbon and carbon monoxide emissions is much greater than would be achieved simply introducing the same amount of additional air into the intake system in the absence of coherent sonic waves. (The same is true to a lesser extent in the case of coherent shock wave energy, vis-a-vis, the additional air involved). In fact, some ways of introduction of the sonic wave energy involve no additional air, e.g., a sonic wave generator in air cleaner 135 or a sonic wave generator without transverse cells in the PCV line. As used in this specification, the term "enough coherent pressure wave energy to atomize more finely the combustible mixture" is to be determined by the resulting reduction of hydrocarbon and carbon monoxide emissions — the reduction is noticeably greater than that achieved by the same amount of additional air in the absence of coherent pressure waves.

It is an established fact that the level of the oxides of nitrogen produced in an internal combustion engine is directly related to the average heat in the combustion cylinders, i.e., the heat in the cylinder averaged over the entire four interval or stroke cycle. In addition to the described reduction in the level of carbon monoxide and hydrocarbon emissions, the level of the oxides of nitrogen drops markedly. It is believed the reduction in the oxides of nitrogen is attributable to two effects exercised on the operation of the engine by the standing sonic waves. First, the standing sonic waves prevent the formation of fuel droplets on the interior walls of manifold 137 and the cylinders. The absence of fuel droplets on the interior walls of the cylinders is particularly important because it prevents the combustion process from taking place in physical contact with these walls. Consequently, the interior walls of the cylinders are not permitted to become as hot during the combustion interval of the cycle. Second, the standing sonic waves improve the rate of heat transfer out of the cylinders through its walls after the combustion interval of the cycle because of increased heat convection to the walls. In summary, the high degree of atomization of the combustible mixture in the cylinders causes more heat to be generated during the combustion interval of the cycle, thereby permitting higher engine efficiency; the isolation of the combustible mixture from the cylinder walls before and during the combustion interval of each cycle causes the cylinder walls to remain cooler during the combustion interval, although more heat is generated; and the improved heat transfer out of the cylinders through its walls causes the heat generated during the combustion interval to be dissipated more quickly after combustion. Although a higher peak value of heat is generated during the combustion interval, the average heat in the cylinders is less. A reduction of the oxides of nitrogen is therefore compatible with a reduction of the carbon monoxide and hydrocarbon emissions, improved engine performance, and less gasoline consumption, because the heat present in the cylinders is more highly concentrated in the time interval of the cylinder cycle where it can be utilized to drive the pistons.

It is also believed the reduction of the oxides of nitrogen may be attributable in part to magnetic fields associated with the coherent sonic waves in some manner not yet fully understood. These magnetic fields may actually inhibit the chemical combination of oxygen and nitrogen.

The presence of the sonic wave generator in air cleaner 135 and sonic wave generator 133 synergistically enhances the effect of sonic wave generator 149 described above. The sonic wave generator in air cleaner 135, in introducing coherent sonic wae energy, energizes the entire carburetor flow stream to atomize the combustible mixture before it reaches plate 144 and to enhance the atomizing action of the transversely propagating coherent sonic wave energy introduced at plate 144. Sonic wave generator 133, which is preferably activated only during engine modes where very large amounts of coherent sonic wave energy is required, strengthens the standing waves in intake manifold 137 and the combustion cylinders. Air management valve 134 could be a vacuum actuated valve that opens during acceleration and remains closed except for a bleed orifice during the other engine modes, as described below in connection with FIG. 27 or an elaborately controlled valve, as described below in connection with FIGS. 28, 30 and 32.

In general, it has been found that the more coherent sonic wave energy that is introduced into the intake system, the better are the results, assuming that the additional air introduced into the intake system is limited so as not to impair these results. There are three degrees of improvement in the level of the oxides of nitrogen achieved by the invention, depending upon the amount of coherent sonic wave energy introduced. In the first degree, when a little coherent sonic wave energy is introduced, the level of the oxides of nitrogen increases as the level of hydrocarbon and carbon monoxide emissions decreases, but this increase of the oxides of nitrogen is noticeably less than the increase of the oxides of nitrogen that occurs when the same decrease of the hydrocarbon and carbon monoxide level is brought about by increasing the air-to-fuel ratio. In the second degree, when more coherent sonic wave energy is introduced, the level of the oxides of nitrogen remains substantially the same as the level of hydrocarbon and carbon monoxide emissions decreases. In the third degree, when still more coherent sonic wave energy is introduced, the level of the oxides of nitrogen decreases as the level of hydrocarbon and carbon monoxide emissions decreases. As used in this specification, the term "enough coherent sonic wave energy to inhibit the production of the oxides of nitrogen" embraces all three degrees of improvement. As mentioned above, all three degrees of improvement provide a much greater reduction in the hydrocarbon and carbon monoxide emissions than would be achieved simply by introducing the same amount of additional air into the intake system in the absence of coherent sonic waves.

FIG. 19 depicts plate 144 and sonic wave generator 149 in detail for the purpose of illustrating one embodiment that the equipment for generating the coherent sonic wave energy can take. It is to be understood, however, that as far as this aspect of the present invention is concerned, the particular configuration of the sonic wave generator is not essential. Any other type of sonic wave generator capable of producing coherent sonic wave energy that will form standing sonic waves in an enclosed region can be used to practice this aspect of the invention. In fact, the partiuclar sonic wave generator disclosed in FIG. 2 is itself the subject of another copending patent application of mine, Ser. No. 85,911, filed Nov. 2, 1970. Sonic wave generator 149 comprises a shock wave generator 167, a resonant cavity 168, and a conduit 169 coupling shock wave generator 167 to cavity 168.

To install plate 144 in the engine of FIG. 18, the following steps are taken: fasteners 147 and 148 are opened; carburetor 136 is lifted from its mounting surface on manifold 137; a gasket 170 and gasket sealer are placed on the mounting surface of manifold 137; plate 144 is placed on gasket 170; a gasket 171 and gasket sealer are placed on plate 144; carburetor 136 is placed on gasket 171; and fasteners 147 and 148 are tightened down to secure the whole assembly, as shown in FIG. 18. Gasket 170 is preferably a conventional automotive gasket, gasket 171 is preferably a gasket that is permanently bonded to the surface plate 144, and gaskets 170 and 171 both correspond in size and shape to plate 144, including openings 145 and 146. Thus, gasket 171 covers the other openings in the surface of plate 144 shown in FIG. 19.

Shock wave generator 167 comprises a shock wave generating unit 172 and a shock wave generating unit 173 connected in parallel between an air management valve 174 and a coupling 175 by Y-connections 176 and 177. Valve 174, which communicates with the atmosphere, is a conventional, such as a standard PCV valve, which normally restricts the flow of air to a low bleed value. When the pressure drop from the atmosphere to connection 176 drops below a minimum value, valve 174 opens to supply a much higher flow of air from the atmosphere to units 172 and 173. This minimum pressure drop represents the transition from idle to acceleration. Valve 174, which could be the same type valve used in the conventional PCV system, serves to prevent too much air flow during idle, cruise, and deceleration, and to supply enough energy to meet the demands of the mode of engine operation. By way of example, the PCV valve disclosed on page 5 of Automotive Smog Control Manual, by Harold T. Glenn, Cowles Education Corporation, New York, N.Y., 1968, could be employed for valve 174. Preferably, units 172 and 173 each comprise a pair of supersonic flow generating cells in tandem with each other, as disclosed in my copending application Ser. No. 13,977, filed Feb. 25, 1970, the disclosure of which is incorporated herein by reference. The individual cells of units 172 and 173 preferably each have the dimensions and hole diameters specified in my U.S. Pat. No. 3,554,443, the disclosure of which is incorporated herein by reference. The only exception is that it is preferable to make the inlet diameter of the cell housing equal to the axial inlet diameter of the nozzle instead of larger.

For the purpose of discussion, it is assumed that the individual cells of units 172 and 173 each have the dimensions and hole diameters specified in U.S. Pat. No. 3,554,443. In such case, for the temperature and pressure conditions normally encountered in automative applications, the subsonic air drawn into units 172 and 173 is converted to a supersonic air stream that produces coherent shock waves having a wavelength in the range of 0.170 inches to 0.194 inches as the principle energy component, depending on the prevailing temperature and pressure conditions. In addition to the principle component, the cells of units 172 and 173 also produce other pressure wave components discussed in U.S. Pat. No. 3,554,443, which have wavelengths that are multiples and/or submultiples of the wavelength of the principle energy component. In fact, it is felt the presence of a plurality of multiply related shock wave wavelengths enhances the coherency of the shock wave and sonic wave energy, i.e., increases the ability of the energy to travel long distances and to atomize the combustible mixture.

Plate 144 has mounting holes 178, 179, 180, and 181, through which the manifold-carburetor fasteners pass. In addition to cavity 168, which communicates at its ends with openings 145 and 146, there are also formed in plate 144, resonant cavities 182, 183, and 184, which communicate with opening 145, and resonant cavities 185, 186, and 187, which communicate with opening 146. As illustrated in FIG. 19, cavities 168, 182, 183, and 184 are spaced around opening 145 at 90° intervals, and cavities 168, 185, 186, and 187 are spaced around opening 146 at 90° intervals. Gasket 171 is bonded to the surface of plate 144, designated 188, so that gasket 171 is pressed into the areas of cavities 168, 182, 183, 184, 185, 186, and 187, and conduit 169 that open to surface 188. The Z dimension depicted in FIG. 19, i.e., the height of cavities 168, 182, 183, 184, 185, 186, and 187 and conduit 169, is measured with gasket 171 in place, i.e., it is the distance from the surface of gasket 171 pressed into the openings to the opposite surface formed by plate 144 itself. The height Z, the depth X, and the width Y of cavities 182, 183, 184, 185, 186, and 187, the height Z and the depth X of cavity 168, and the width Y and the height Z of conduit 169 are all preferably equal to the wavelength of the principle energy component produced by units 172 and 173, e.g., 0.172 inches. The width Y of cavity 168 is not important, it being determined only by the spacing between openings 145 and 146, which are in turn determined by the spacing between inlet orifices 150 and 151. In some cases, it may be advantageous to change the X, Y and/or Z dimensions of cavities 182, 183, 184, 185, 186, and 187, the X and/or Y dimension of conduit 169, or the X and/or Z dimensions of cavity 168 to equal some multiple or submultiple of the wavelength of the principle energy component, depending on the air flow that can be tolerated. Conduit 169 could also have a circular cross section with a diameter Y instead of a square one. In general, the X, Y, and Z dimensions of the cavities and conduit, and the wavelength or wavelengths of the shock wave energy are all multiply related. (The multiple may be 1.)

The substmospheric pressure created in manifold 137 by the operation of the engine establishes between valve 174 and resonant cavity 168 a pressure drop that draws air through units 172 and 173, thereby producing shock wave energy. Thus, connections 176 and 177 constitute a fluid line connecting the atmosphere to the interface betwween carburetor 136 and intake manifold 137 via plate 144, shock wave generator 167 is disposed in this fluid line to convert a portion of the energy of the air drawn from the atmosphere into pressure waves that propagate into the intake system, and air management valve 174 is disposed in this fluid line to control the flow rate of air from the atmosphere responsive to the mode of engine operation. The shock wave energy produced by units 172 and 173 is coupled through conduit 169 to resonant cavity 168 where this shock wave energy is converted to coherent sonic wave energy by resonant action. The sonic wave energy propagates outwardly from the ends of cavity 168 into openings 145 and 146 in the direction of the plane of plate 144 to form across openings 145 and 146 standing sonic waves. part of this sonic wave energy is intercepted by resonant cavities 182, 183, and 184, and resonant cavities 185, 186, and 187 to further enhance the intensity and uniformity of the stnading sonic waves formed across openings 145 and 146. The sonic energy then propagates from openings 145 and 146 in a direction transverse to the plane of plate 144, thereby also forming in manifold 137 and the combustion cylinders standing sonic waves. The volume of air introduced into the intake system by sonic wave generator 149 is small, e.g., below 10 percent of the total air intake, so the combustible mixture from the carburetor is not made too lean by the introduction of the sonic wave energy.

In the course of engine operation, the pressure drop from the atmosphere to intake manifold 137 varies substantially and the pressure drop becomes quite small during acceleration. Even with small pressure drops, sonic wave generator 149 is capable of producing coherent sonic wave energy of high intensity. Further, as described in U.S. Pat. Nos. 3,554,443 and 3,531,048, the cells comprising units 172 and 173 are self compensating for pressure changes, continuing to produce shock waves of substantially the same wavelength, i.e., within a ± 10 percent range, as the pressure drop varies.

Thus, the dimensions X, Y, and Z, after they are once matched to the dimensions of the cells, remain suitable and effective for all operating conditons of the engine.

In FIG. 20 is shown an alternative embodiment of the shock wave generator 167 and plate 144. The particular shape of the outer perimeter of plate 144 is dictated by the shape of the mounting flanges at the interface between carburetor 136 and intake manifold 137. The same reference numerals are employed in FIG. 20 to designate elements corresponding to the elements of the embodiment of FIG. 19. The components of shock wave generator 167 are housed in a cylindrical cannister 190. Units 172 and 173 are identical. Valve 174 has been replaced by identical air management valves 174a and 174b, which are connected at one end by couplings 191 and 192, respectively, to units 172 and 173. At the other end, valves 174a and 174b are connected to couplings 193 and 194, respectively. Rubber hoses 195 and 196 connect couplings 193 and 194, respectively, to couplings 197 and 198, respectively, at plate 144. A fine mesh 199 covers the end of cannister 190 opposite couplings 193 and 194 to prevent foreign matter from entering. The vacuum of the engine draws air through mesh 199 into units 172 and 173 and through valves 174a and 174b and hoses 195 and 196 to plate 144.

In contrast to the embodiment of FIG. 19, valves 174a and 174b are disposed downstream of units 172 and 173. As a result of this rearrangement, it has been found that the snap-action valves open and close more reliably in response to changes in the mode of operation of the engine and that the level of the sonic wave energy introduced into the intake system is enhanced somewhat. It is believed that the plug of the valve amplifies to some extent the shock waves emanating from the shock wave generating unit.

The packaging arrangement of FIG. 20 is a particularly important practical aspect of the installation of the equipment in the engine space. Cannister 190 can be mounted any place under the hood where space permits and coupled by hoses 195 and 196 to plate 144, which is disposed at the carburetor-manifold interface. As long as the diameter of hoses 195 and 196 and the wavelength of shock wave energy are multiply related, the attenuation in hoses 195 and 196 does not significantly affect the results.

In FIG. 20, conduits 169a and 169b replace the upstream portion of conduit 169 and a transverse conduit 200 couples conduits 169a and 169b to the downstream portion of conduit 169 and to cavities 182 and 187. Conduits 169a and 169b ae connected to hoses 195 and 196, respectively, by couplings 197 and 198. Conduits 169a and 169b have round cross sections with a diameter preferably equal to the X, Y, and Z dimensions of the cavities. The distance U along conduit 200 between conduits 169a and 169 and the distance V along conduit 200 between conduits 169b and 169 are each a whole number of wavelengths of the principle energy component, e.g., 0.172 inches. In other words, the U and V dimensions are both multiples of the X, Y, and Z dimensions. It has been found that such dimensioning tends to make the flow rate through the sonic wave generator directly dependent upon the absolute pressure in the intake manifold. As a result, when valves 174a and 174b open and close responsive to pressure changes in the course of engine operation, the transition in the flow rate into the intake system through the sonic wave generator is made more gradual than the sudden change in the orifice area of the valves alone would dictate. Cavities 182, 183, 184, 185, 186, and 187 are effectively cubicle, i.e., cubicle to within ± 10 percent of the nominal dimensions, although their back surfaces are actually rounded to facilitate the machining operation required to form them.

Figure 22:
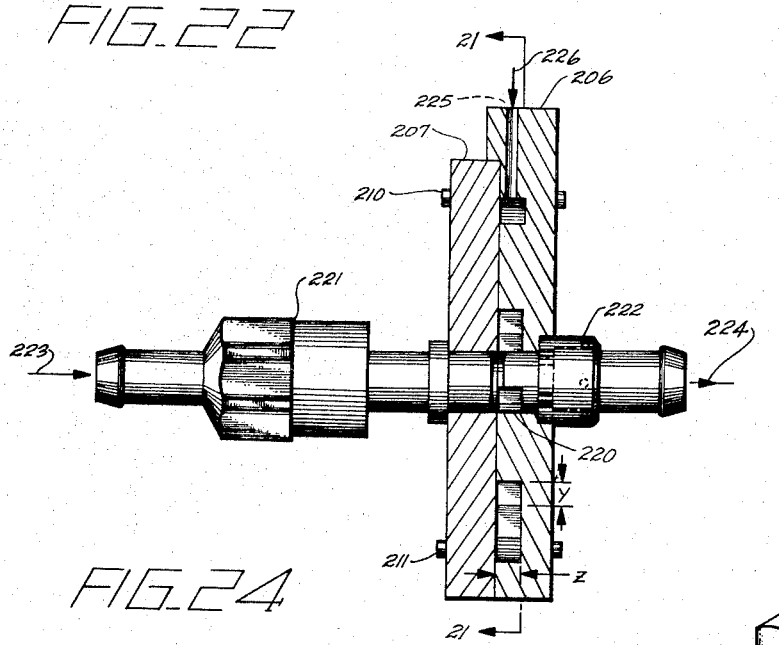

FIGS. 21 and 22 show a sonic wave generator through which the flow rate is even more strongly dependent upon the absolute pressure in the intake manifold. A network 205 of channels having a rectangular, preferably square, cross section is formed by grooves on one side of a metal plate 206 and the adjacent side of a metal plate 207, which is clamped to plate 206 by fasteners 208, 209, 210, and 211. Network 205, which is constructed in clamped plates 206 and 207 only for ease of prototype fabrication, could be formed in any other type of convenient structure. Network 205 comprises a circular channel 212 that circumscribes an equilateral triangular channel 213, channels 214, 215, and 216 that connect circular channel 212 with the corners of triangular channel 213, and channels 217, 218, and 219 that connect the midpoints of the sides of triangular channel 213 with a transverse central passage 220.

This sonic wave generator is adapted for placement in the PCV return line as pressure wave generator 131 in FIG. 17. It could also be used as sonic wave generator 133 (FIG. 18) or substituted for shock wave generator 167. In a one piece construction with plates 206 and 207 are an air management valve 221 and a supersonic flow generating cell 222, which is identical to one of the supersonic flow generating cells referred to in connection with FIG. 19. Valve 221 replaces PCV valve 128 (FIG. 17), which is removed permanently when the sonic wave generator is installed. One end of central passage 220 is connected to valve 221 and the other end of central passage 220 adjoins cell 222, which is press fitted in a counterbore formed in plate 206. A bleed conduit 225 connects circular channel 212 to the atmospheric pressure external of plate 206. The combustible emissions from the crankcase manifold flow through hose 130 to valve 221, as represented by an arrow 223 and from cell 222 through hose 130 to the intake system, as represented by an arrow 224. As represnted by an arrow 226, a small amount of air from the atmosphere is drawn into conduit 225 and mixes with the combustible mixture returned from the crankcase manifold.

The sides of the cross section of the channels, i.e., the Y and Z dimensions (FIG. 22) and the distances between the junctions of circular channel 212 with connecting channels 214, 215, and 216, and the junctions of triangular channel 213 with connecting channels 217, 218, and 219, i.e., the R, R', S, S', T, and T' dimensions (FIG. 21) are all multiply related. As a result of this dimensional interrelationship, the energy of the fluid stream flowing through valve 221 is converted into coherent sonic wave energy having a wavelength equal to the Y and Z dimension, e.g., 0.172 inches. The diameter of bleed conduit 225 is also multiply related; e.g., if the Y and Z dimensions are both 0.172 inches, the diameter of bleed conduit 225 is 0.086 inches. As a result of this dimensional relationship, the small stream of air flowing through bleed conduit 225 serves to enhance the intnesity of the sonic wave energy. The dimensions of cell 222 match the X and Y dimension of network 205; e.g., if the X and Y dimensions are both 0.172 inches, cell 222 has the dimensions specified in U.S. Pat. No. 3,554,443, with the exemption pointed out in connection with the cells of units 172 and 173 (FIG. 19). As a result of this dimensional interrelationship, cell 222 also serves to enhance the intensity of the sonic wave energy generated in network 205.

Figure 23:
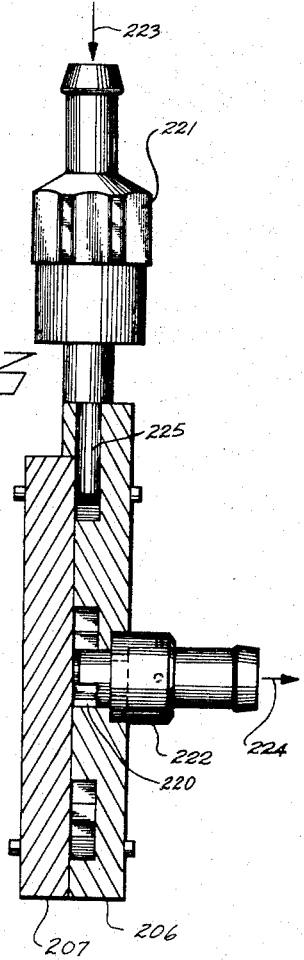
FIG. 23 is a side sectional view of an alternative arrangement of the apparatus of FIGS. 21 and 22.

In FIG. 23 a modifiction of the sonic wave generator of FIGS. 21 and 22 is shown. In partiucular, valve 221 is connected to conduit 225, conduit 225 is expanded to have a diameter equal to the Y and Z dimension, and the portion of central passage 220 in plate 207 is eliminated. As a result, the combustible mixture returned by the PCV line flows through valve 221 to circular channel 212 and from there through triangular channel 213 to central passage 220. From central psssage 220 the returned mixture flows through cell 222 to the intake system. No air is bled to network 205 from the atmosphere in this arrangement.

Both the sonic wave generator of FIGS. 21 and 22 and the modification of FIG. 23 directly energize to a high degree the combustible mixture returned by the PCV system and indirectly energize the combustible mixture in the intake system.

The features of the devices disclosed in FIGS. 20 through 23 are the subject of separate patent applications to be filed at a later date. It should be noted that network 205 can be considered to be an extension of the principle of the network comprising conduits 162a, 169b, 200, and 169, which correspond, for example, respectively to channels 214, 215, the portion of channel 213 therebetween, and channel 217.

Figure 24:
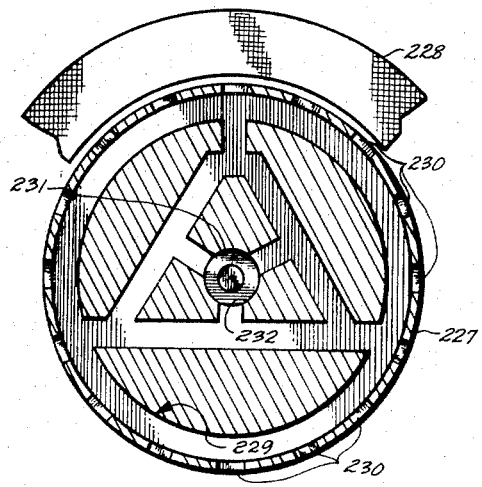
FIG. 24 is a top sectional view of apparatus for introducing sonic waves into the stream of air flowing into the carburetor.

FIG. 24 shows a flat circular metallic plate 227 which fills the space inside a filter element 228 of the automobile air cleaner. Plate 227 has a network 229 of grooves identical in shape to network 205. A plurality of conduits 230 connect the inside of filter element 228 to the circumscribing circular groove of network 229. Plate 227 and another plate (not shown), which covers the grooves to form the channels of network 229, are placed within filter element 228 so all the air that passes through filter element 228 is coupled to the circumscribing circular channel of network 229. The channels of network 229 have a sufficiently large cross section to pass all the air required by the automobile engine. The R, R', S, S', T, and T' dimensions are all multiples of the Y dimension, the Y and Z dimensions are equal, and the diameter of conduits 230 is equal to the Y dimension. In general, these dimensions would all be much larger than the dimensions of the sonic wave generator disclosed in FIGS. 21 through 23 in connection with a PCV return line because of the larger flow rate of the fluid that must be processed. A supersonic generating cell 231, which is identical to cell 222 except its dimensions of network 229 match the Y dimension and are sufficielntly large to provide the carburetor with enough air, is connected to network 229 by a central passage 232 in plate 227. Network 229 and cell 231 introduce into the intake system (FIG. 18) coherent sonic waves that energize the entire stream of air flowing through carburetor 136. In connection with this arrangement, it would also be desirable to employ a supersonic generating cell in the booster venturi, as disclosed in FIG. 8.

Figure 26:
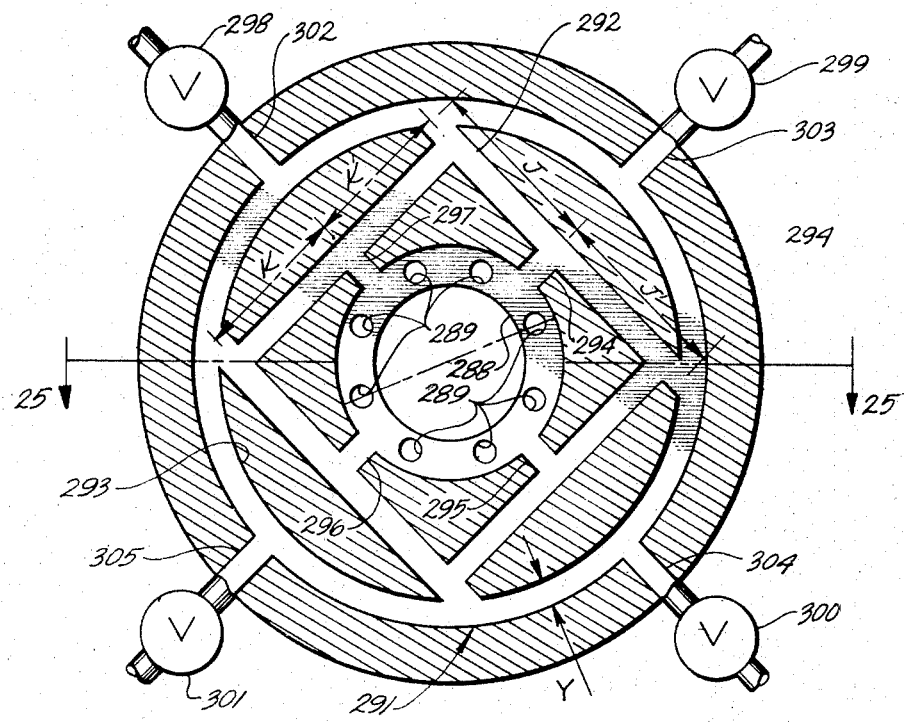
FIG. 26 is a top sectional view of the apparatus of FIG. 25.
Figure 25:
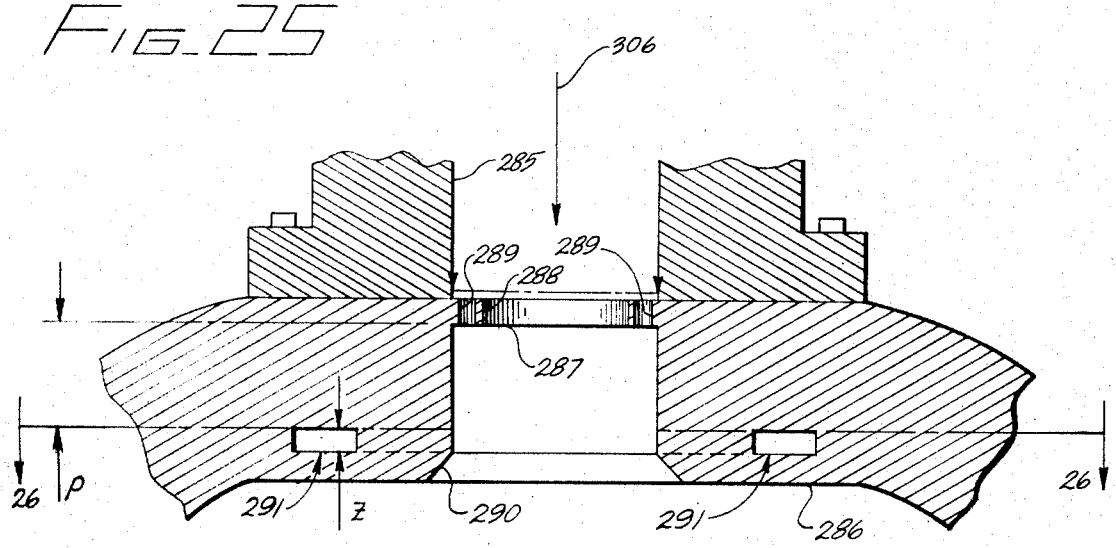
FIG. 25 is a side sectional view of apparatus for introducing sonic waves into the stream of air flowing from the carburetor to the intake manifold.

As an alternative to the sonic wave generator of FIG. 24, which energizes the entire air stream prior to carburetion, this function could be performed during or after carburetion. It is particularly advantageous to energize the entire stream of the combustible mixture as it passes from the carburetor through the inlet orifice or orifices of the intake manifold, as depicted in the arrangement of FIGS. 25 and 26. This arrangement combines the feature of the sonic wave generator of FIG. 21 with the features of the nozzle of FIG. 3 in an intake system having a single barrel carburetor. It will be understood that this arrangement could be implemented as well in a multiple barrle carburetor. A single barrel carburetor 285 is mounted on an intake manifold 286. A baffle 287, which is shown as an integral part of the casting of manifold 286, but which could be a separate insert, is disposed across the inlet of intake manifold 286 where it it connected to the outlet of carburetor 285. Baffle 287 has a large central hole 288 and a plurality of small holes 289 annularly arranged around hole 288. The diameter of hole 288 is a multiple of the diameter of holes 289. For example, the diameter of hole 288 could be 1.032 inches, and the diameter of holes 289 could be 0.172 inches. In general, hole 288 is made as large as possible to minimize the restriction of the air flow imposed by baffle 287, while maintaining the multiple relationship between the diameters of holes 288 and 289. A 45° countersink 290 is formed at the end of the inlet of intake manifold 286. A network 291 of channels having a rectangular, preferably square, cross section is formed in the casting of manifold 286. Alternatively, network 291 and baffle 287 could be formed in a separate unit that is placed between the mounting flanges of the carburetor and the intake manifold, as plate 144 in FIGS. 19 and 20. Network 291 extends along an imaginary plane that crosses the inlet of intake manifold 286 between baffle 287 and countersink 290. It comprises a square channel 292, a circular channel 293 that circumscribes and communicates with the corners of square channel 292, and channel 294, 295, 296, and 297 that connect the midpoints of the respective sides of square channel 292 with the inlet of intake manifold 286. The sides of the cross section of the channels, i.e. the Y dimension (FIG. 26) and the Z dimension (FIG. 25) and the distances between the junctions of circular channel 293 with the corners of square channel 292 and the junctions of square channel 292 with connecting channels 294, 295, 296, and 297, i.e., the J, J', K, and K' dimensions (FIG. 26) are all multiply related. Under the control of air management valves 298, 299, 300, and 301, air from the atmosphere is supplied to circular channel 293 by conduits 302, 303, 304, and 305, respectively. Conduits 302 through 305, which are spaced at 90° intervals around circular channel 293, each have either a square or circular cross section and have a dimension that is multiply related to the X and Y dimensions. The dimensions of network 291 and conduits 302 through 305 are also multiply related to the diameters of holes 288 and 289. For example, the K and K' dimensions could each be 1.032 inches, the J and J' dimensions could each be 1.204 inches, the Z and Y dimensions and the circular diameter of conduits 302 through 305 could each be 0.172 inches. The distance P between the downstream surface of baffle 287 and the upstream surface of network 291, although not critical, could be 0.344 inches. Preferably, valves 298 through 301 are controlled by one of the techniques described below in connection with FIGS. 29 through 34, so only valve 298 is open during idle, only valves 298 and 300 are open during cruise and deceleration, only valves 298, 299, and 300 are open during acceleration at a low rate, and valves 298 through 301 are all open during acceleration at a high rate.

Hole 288, holes 289, connecting channels 294 through 297, and countersink 290 are analogous respectively to inlet 33, holes 35, holes 36, and countersink 28 of the nozzle in FIG. 3. The air flowing into the inlet of intake manifold 286 through connecting channels 294 through 297 and the combustible mixture flowing into the inlet of intake manifold 286 through holes 289 form a converging-diverging boundary layer in the same manner as the corresponding holes of the nozzle in FIG. 3. Thus, the stream of the combustible mixture from carburetor 285, which is represented by an arrow 306 (FIG. 25), is accelerated as it passes through the inlet of intake manifold 286. Circular channel 293, square channel 292, connecting channels 294 through 297, and conduits 302 through 305 are analogous respectively to circular channel 212, triangular channel 213, connecting channels 217 through 219, and conduit 225 in FIG. 21. Coherent sonic waves are induced in the air stream supplied to network 291 by channels 302 through 305. The sonic waves are coupled by connecting channels 294 through 297 to the inlet of intake manifold 286 where they stabilize the converging-diverging boundary layer and interact with the accelerating stream of the combustible mixture from carburetor 285 to energize it thoroughly. The stabilizing effect that the coherent sonic wave energy exercises on the boundary layer within the inlet of intake manifold 286 is very significant because it removes the size restriction on the nozzle and thereby permits large quantities of fluid to be thoroughly energized. In contrast, if the nozzle of FIG. 3 is increased appreciably in size, the boundary layer without benefit of coherent sonic waves tends to separate, thicken, and generally deteriorate. The intensity of the energization of the carburetor flow stream depends upon the amount of atmospheric air supplied by conduits 302 through 305. Thus, valves 298 through 301 control the amount of energy introduced into the carburetor flow stream in accordnace with the mode of engine operation.

Figure 27:
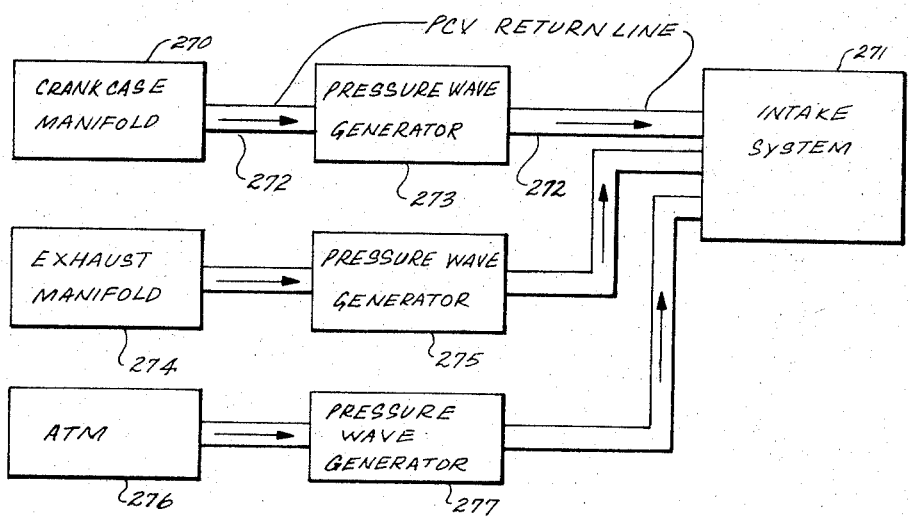
FIG. 27 is a schematic block diagram depicting three ways in which pressure wave energy is simultaneously inroduced into an intake system.

A synergistic effect on the engine operation results when coherent pressure wave energy is simultaneously introduced into the PCV return line as disclosed in FIG. 17 and at the interface between the carburetor and the intake manifold as disclosed in FIG. 18. FIG. 27 depicts such an arrangeent. Blowby gases and other crankcase emissions are coupled from a crankcase manifold 270 to an intake system 271 by a PCV return line 272, in which is connected a pressure wave generator 273. Preferably, pressure wave generator 273 comprises the sonic wave generator disclosed in FIG. 21. Exhaust emissions from an exhaust manifold 274 are coupled either directly or through a catalyst bed to a pressure wave generator 275 and air from the atmosphere, represented by a block 276 is coupled to a pressure wave generator 277. Generators 275 and 277, which preferably comprise the sonic wave generator of FIG. 19 or FIG. 20, introduce coherent pressure wave energy into intake system 271 at the carburetor-intake manifold interface. Two plates could be stacked on top of each other between the mounting flanges of the intake manifold and the carburetor or a single plate could be provided with two shock wave generating units, one fed from the atmosphere and the other fed from the exhasut manifold.

Thus, the exhaust emissions are energized by generator 275 and returned to intake system 271 for recombustion. Air management valves (not shown) are connected in series with generators 273, 275, and 277 to control the pressure wave energy and returned emissions, in the manner described below in connection with FIGS. 27 through 32. Assuming devices that produce coherent sonic waves are selected as generators 273, 275, and 277, a very effective triple veil of standing sonic waves is established transverse to the direction of the carburetor flow stream. Not only is the fresh combustible mixture energized by the veil, but the returned exhaust and crankcase emissions are more thoroughly atomized. The arrangement of FIG. 25, as well as the arrangement of FIG. 17, illustrates the point that the principles of the invention can be used to make prior art techniques for control of engine emissions more effective. In some cases it may be desirable to use only two of the three pressure wave generators, depending upon the circumstances. Further, any one or all three of the pressure wave generators could comprise the apparatus of FIG. 25; in other words, exhaust emissions and/or crankcase emissions could be returned through one or more of conduits 302 through 305 (FIG. 26) instead of supplying atmospheric air thereto.

Figure 28:
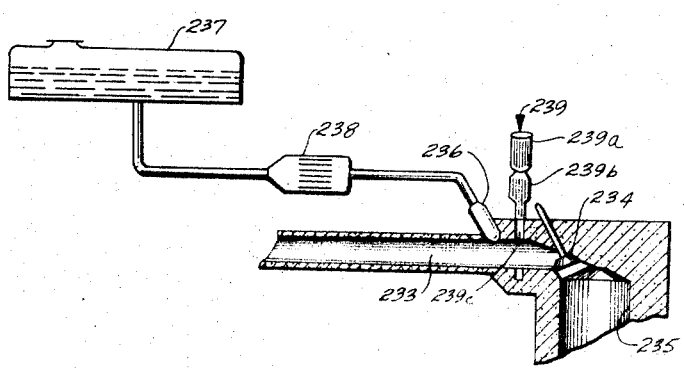
FIG. 28 is a side sectional elevation view of apparatus for injecting sonic wave energy directly into a combustion cylinder at its intake valve.

In FIG. 28, which represents a fuel injection system of an internal combustion engine, coherent sonic wave energy is injected directly into the combustion cylinders with the fuel. An intake manifold 233, which supplies air for combustion, is coupled by an intake valve 234 to a combustion cylinder 235. An electronically or mechanically controlled fuel injection nozzle 236 is disposed in manifold 233 a short distance from and oriented toward intake valve 234. Fuel under pressure is supplied to nozzle 236 from a fuel tank 237 by an electric fuel pump 238. The fuel injection control mechanism is conventional. Coherent sonic wave energy is introduced at a point between nozzle 236 and intake valve 234 by a sonic wave generator 239. Sonic wave generator 239 comprises a shock wave generating unit 239a, an air management valve 239b, and a network 239c of conduits and cavities having a square cross section. Although sonic wave generator 239 could take any form, it is preferably a device similar to that disclosed in FIG. 19, with three exceptions. First, instead of being formed in a separate plate, the conduits and cavities are cast directly into the existing structure of the engine. Second, instead of two openings as required for a double barrel carburetor, a single opening is provided, which coincides with the cross section of manifold 233. Third, air management valve 239b is located downstream of shock wave generating unit 239a, as taught in connection with FIG. 20. Separate networks 239c, which are all fed by a single unit 239a, could be provided for the other cylinders of the engine. Coherent pressure wave energy could be injected in the same manner into the cylinders of a carbureted engine.

As an alternative to the fuel injection system of FIG. 28, the coherent pressure wave energy could be introduced at a single point in the intake manifold that is common to all the combustion cylinders, i.e., upstream of the fuel nozzles, by the apparatus of FIGS. 25 and 26.

Of all the modes of engine operation, the need for coherent sonic wave energy is greatest during acceleration for three reasons. First, the carburetor does not atomize the combustible mixture as well because of the nearly atmospheric pressure in the intake manifold. Second, the higher frequency of engine ignitions results in less complete combustion. Third, more heat is generated in the cylinders, which encourages the production of oxides of nitrogen. Therefore, in converting to coherent pressure waves the energy from a stream of air induced by the engine vacuum, the flow rate of this air stream must be controlled as a function of the mode of engine operation, becasue the pressure drop between the atmosphere and the intake manifold is inversely related to the needs of the engine for coherent sonic wave energy. In other words, the most coherent pressure wave energy is required during acceleration when the absolute pressure in the intake manifold is closest to atmospheric pressure, and the least coherent pressure wave energy is required during idle when the absolute pressure in the intake manifold is furthest from atmospheric pressure. If too little coherent pressure wave energy is applied for the mode of engine operation, the beneficial results described herein are not fully achieved. On the other hand, if too much coherent pressure wave energy is supplied for the mode of engine operation, the additional air introduced into the intake system with the coherent pressure wave energy may change the air-to-fuel ratio sufficiently to adversely affect engine performance or increase emissions. The flow rate of this air stream is controlled by the air management system in accordance with the features of the invention described below in connection with FIGS. 29 through 34. Any one of the disclosed air management systems could be substituted for the air management valve in FIGS. 17 through 23.

The air management system can take a number of different forms that vary widely in complexity. If a vacuum-operated valve is employed as discussed in connection with FIGS. 17 through 23, FIG. 29 depicts the effective orifice area of the valve as a function of the absolute pressure in the intake manifold, which represents the mode of engine operaton. For the purpose of illustration, it is assumed that the plug of the valve is biased by a 12 pound spring to open when the absolute pressure in the intake manifold exceeds 9 psi, and the bleed orifices of the valve are designed to permit a flow rate of between 0.8 and 1.6 cubic feet per minute when the valve is closed by the engine vacuum. When the engine is idling, cruising, or decelerating, the engine vacuum creates an absolute pressure of less than 9 psi in the intake manifold and the effective orifice area of the valve is at a small bleed value, as represented by a segment 240 in FIG. 29. When the engine is accelerating, the engine vacuum creates an absolute pressure of more than 9 psi in the intake manifold, the biasing spring opens the valve plug, and the effective orifice area of the valve becomes much larger, as represented by a segment 241 in FIG. 29. The graph of FIG. 29 has been idealized for simplification; in practice, the transition between segments 240 and 241 occurs over a finite range of absolute pressure, rather than abruptly at a single value of absolute pressure.

For the sake of simplicity, the air managment valve operation of FIG. 29 compromises to some extent the requirements of the engine for coherent pressure wave energy. Specifically, more coherent pressure wave energy is actually required during cruise or deceleration than during idle, and the need for coherent pressure wave energy during acceleration is directly related to the rate at which the engine is accleerating. FIG. 30 shows schematically an air management system that accounts for the first of these factors and FIG. 32 shows schematically an air management system that accounts for both of these factors.

In FIG. 30, air from the atmosphere is supplied to a pressure wave generator 242 through a solenoid operated valve 243 and a vacuum operated valve 244 in series. Pressure wave generator 242 is coupled to the intake system, which is represented by a block 245. Valves 243 and 244 both have a bleed orifice that permits air to flow at a low rate when the valve is closed. The bleed orifice in valve 244 is much larger than the bleed orifice in valve 243, so the bleed orifice in valve 243 is determinative of the flow rate when both valves are closed. Valve 243 is normally closed. Valve 244 is the same type of valve described in connection with FIG. 29. A generator 246, which is a pre-existing conventional component of the electrical system of the automobile, is coupled to a threshold detector 247. When the electrical output signal from generator 246 exceeds a predetermined amplitude, which is representative of the maximum angular velocity of the engine during idle, e.g., 800 RPMs, threshold detector 247 generates an electrical signal that opens valve 243.

In FIG. 31 is shown a graph of the effective orifice area of valves 243 and 244 considered as a single unit as a function of the engine operation. A solid segment 248 represents the effective orifice area as a function of the engine angular velocity, i.e., RPM, and a dashed segment 249 represents the effective orifice area as a function of the absolute pressure in the intake manifold, i.e., $P_A$. When the engine is running below 800 RPMs, generator 246 does not provide a signal of sufficient amplitude to exceed the threshold of detector 247, so valve 243 remains closed. As represnted by segment 248, there is a very small effective orifice area during idle so air is bled to pressure wave generator 242 at a very low rate. Above 800 RPMs the signal from generator 246 exceeds the threshold of detector 247 so valve 243 opens. As long as the engine is operating off idle, there is substantially larger effective orifice area permitting a higher flow rate. As represented by segment 249, the effective orifice area remains at an intermediate value at intake manifold absolute pressures below a certain point, e.g., 9 psi, and jumps to a larger value when the intake manifold absolute pressure rises above 9 psi. Thus, durng idle air is bled to pressure wave generator 242 at a very low rate, during acceleration air is applied to pressure wave generator 242 at a relatively high flow rate, and during the remaining modes, cruise and deceleration, air is bled to pressure wave generator 242 at an intermediate flow rate.

Figure 32:
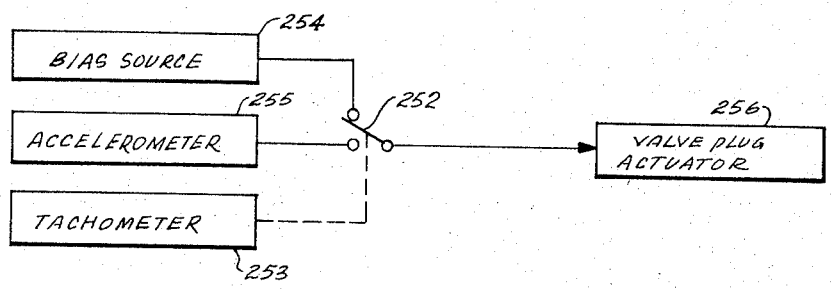
FIG. 32 is a schematic block diagram of a still more effective air management system.

In FIG. 32, a switch 252 is controlled by a tachometer 253, which is coupled to the engine to sense its angular velocity. As in FIG. 30, the generator could be used for this purpose. A bias source 254 and an accelerometer 255 are alternatively coupled by switch 252 to a valve plug actuator 256. Actuator 256 positons a plug in an analog valve to control the flow rate of an air stream being converted to coherent pressure wave energy. Actuator 256 could comprise a servo arrangement that senses the actual flow rate through the analog valve and adjusts the plug position until the actual flow rate equals the commanded flow rate. In FIG. 33, is shown a graph of the air flow rate through the analog valve controlled by actuator 256 as a function of the engine operation. A solid segment 257 represents the air flow rate as a function of the engine angular velocity, i.e., RPM, and a dashed segment 258 represnts the air flow rate as a function of the rate at which the engine accelerates, i.e., XL. When the engine is running below a low angular velocity that represents idle, e.g., 800 RPMs, tachometer 253 maintains switch 252 in the position shown so that a constant bias signal is applied to actuator 256. As represented by segment 257, the bias signal maintains a substantially constant low flow rate while the engine is idling. Above the idle value of angular velocity, tachometer 253 maintains switch 252 in its other position to couple the output of accelerometer 255 to actuator 256. The signal from accelerometer 255 is directly proportional to the rate at which the engine is accelerating. Thus, as represented by segment 258, the air flow rate through the analog valve is directly related to the rate at which the engine is accelerating. FIG. 32 is intended to be a schematic representation of the air management system. In fact, electrical, mechanical, or pneumatic signals could be employed to control actuator 256. Further, the constant idle flow rate could be established by a bleed orifice when the valve is closed by its plug rather than a bias source.

Although the flow rate through conventional fluid devices is directly related to the pressure drop across the device, the flow rate through some of the devices disclosed herein, specifically the devices disclosed in FIGS. 20 through 26, is to varying degrees related to the absolute pressure at the outlet of the device. To the extent that the fluid device has this characteristic, the task of the air management system is facilitated. In other words, the device itself helps to regulate the flow rate in the proper manner as a function of mode of engine operation, which is reflected by the absolute pressure in the intake manifold. To some extent, the supersonic flow generating cell disclosed in U.S. Pat. NO. 3,554,443 also regulates itself in the proper manner when a vacuum induced air stream is channeled through it because the effective throat area of the cell increases as the absolute pressure in the intake manifold increases, i.e., as the pressure drop decreases. In some cases, it is conceivable that the air management system can be completely eliminated or at least greatly simplified.

Figure 34:
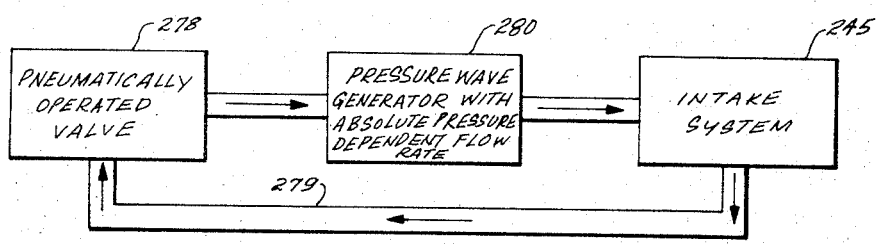
FIG. 34 is a schematic block diagram of an alternative to the air management system of FIG. 30.

FIG. 34 shows a modification of the system of FIG. 30. Valve 243, generator 246, and detector 247 are replaced by a pneumatically operated valve 278, which is actuated directly by the absolute pressure in the intake manifold. For the purpose of controlling valve 278, a conduit 279 couples intake system 245 to valve 278. At a low absolute pressure representing idle, valve 278 is closed except for a small bleed orifice and above such low absolute pressure valve 278 opens. A pressure wave generator 280 with a flow rate dependent upon absolute pressure, is selected. This is preferably the sonic wave generator of FIGS. 21 and 22. In such case, when the engine is off idle and valve 278 is open, the pressure wave generator itself can maintain an approximately constant air flow rate over the range of intake manifold pressures. Valve 278 responds more faithfully to the mode of engine operation because it is operated directly by the intake manifold pressure rather than the pressure drop across valve 278 itself.

The invention covered in this specification is concerned with the introduction of coherent pressure wave energy into the intake system of an internal combustion engine, irrespective of the structure of the devices for generating the pressure waves. Many of these devices are themselves covered by other patents and applications of mine. For example, the supersonic flow generating cell disclosed in FIGS. 3 and 4 is claimed in my U.S. Pat. no. 3,554,443, the sonic wae generator disclosed in FIG. 19, is claimed in application Ser. No. 85,911, filed Nov. 2, 1970, and the sonic wave generators disclosed in FIGS. 20 through 26 are to be claimed in later filed applications. Where a shock wave generator or a sonic wave generator is called for in this specification, any one of the referenced devices could be used. In particular, the sonic wave generator disclosed in FIGS. 21 and 22, or the modification of FIG. 23, could be substituted for shock wave generator 167 in FIG. 19 or FIG. 20. The sonic wave generator of FIG. 22 would be coupled to plate 144 by a yoke that serves as a Y-connection. Further, other types of devices not disclosed herein could also be used. For example, the device disclosed in applicaton Ser. No. 111,995 could be used where a sonic wave generator is specified, and the devices disclosed in application Ser. No. 13,977 and Ser. No. 17,484 could be used where a shock wave generator is specified.

Throughout the description of the various embodiments for practicing the invention the dimension 0.172 inches appears repeatedly. It is felt this dimension, including a range from about 0.170 to 0.195 inches, and a corresponding pressure wave wavelength in a range from 0.170 to 0.195 inches has special significance in producing the described results in the intake system of an internal combustion engine. Therefore, it is preferred to use pressure wave energy having a principle component wavelength in the range from 0.170 to 0.195 inches, although there may be other wavelengths that are also effective. It is believed the reason for this special significance is as follows: Electromagnetic waves are generated by the apparatus disclosed herein. These electromagnetic waves, which propagate at the speed of light, align the air molecules to produce a resulting disturbance in the form of pressure waves, which propagate at the speed of sound. The ratio of the speed of light to the speed of sound in air at standard conditions is equal to $0.087 \times 10^7$, which is one half of 0.174. Thus, the dimensional range 0.170 to 0.195 causes the electromagnetic waves to propagate in such a way as to order and reinforce the resulting disturbance, i.e., the pressure waves, thereby producing the described results.

The invention also produces another beneficial result in that the pressure waves ultrasonically clean the engine components to which the pressure waves are exposed. Thus, engine deposites are removed from such components as spark plugs, the carburetor, intake and exhaust valves, and the air cleaner.

The described embodiments of the invention are only considered to be preferred and illustrative of the inventive concept; the scope of the invention is not to be restrictive by such embodiments. Various and numerous other arrnagements may be devised by one skilled in the art without departing from the spirit and scope of this invention. For example: although aluminum has been utilized for the plates in FIGS. 19 through 24, in some cases cast iron could be used to advantage; a number of the sonic wave generators disclosed herein could also be molded from plastic instead of metal; the principles of the invention are applicable to the so-called Wankel engine and other engine types; the stream of air converted to pressure waves could be induced by a positive pressure pump instead of the engine vacuum; pressure waves could conceivably be generated by conversion of some other form of energy than an air or fluid stream; and the pressure waves can be introduced into the intake system in different ways not disclosed herein or by different combinations of ways than the disclosed combinations.

Reference is made to continuation-in-part application Ser. No. 227,589, filed Feb. 18, 1972, which claims some of the subject matter disclosed in the present application as well as later improvements thereof.

I claim:

1. In an internal combustion engine having one or more combustion chambers, a carburetor for mixing air and fuel to form a combustible mixture, an intake manifold for coupling the combustible mixture from the carburetor to the combustion chamber, and an interface between the carburetor and the intake manifold, the improvement comprising:
   a source of fluid at a higher pressure than the intake manifold;
   a fluid line connecting the source to the interface between the carburetor and the intake manifold to draw fluid from the source through the fuid line into the intake manifold without passing through the carburetor;
   means in the fluid line for converting a portion of the energy of the fluid drawn from the source into pressure waves that propagate with the fluid into the intake system; and
   valve means in the fluid line responsive to the mode of engine operation for controlling the flow rate of the fluid from the source drawn into the intake system through the entrance.

2. The combination of claim 1, in which the source of fluid is air at atmospheric pressure.

3. The combination of claim 2, in which the converting means comprises:
   means for generating shock waves having an intensity related to the flow rate established by the controlling means;
   a resonator dimensioned relative to the wavelength of the shock waves to convert the shock waves to sonic waves; and
   means for coupling the shock waves to the resonator to covert them to sonic waves.

4. The combination of claim 3, in which the resonator is located at the interface between the carburetor and the intake manifold, the generating and controlling means are remotely located from the interface, and the coupling means comprises a conduit having a cross-sectional dimension multiply related to the wavelength of the shock waves.

5. The combination of claim 3, in which the resonator is formed in a flat plate interposed between the carburetor and the intake manifold at the interface.

6. The combination of claim 5, in which the means for generating shock waves is a shock wave generating cell comprising:
   a cylindrical nozzle body open at its end adjacent to the coupling means, bounded along its length by a side wall, and bounded at its other end by an end wall having a large center hole;
   a plurality of smaller equally spaced peripheral holes disposed about the center hole in the end wall in oppositely arranged pairs;
   a plurality of pairs of oppositely disposed throat plane stabilizing holes lying in a common plane in the side wall near the open end of the body; and
   a cylindrical cover enclosing the nozzle body to form an annular region surrounding the cylindrical side wall of the nozzle body, the cell cover completely enclosing the nozzle body except for its open end and an opening at its upstream end that communicates with the holes of the nozzle body.

7. The combination of claim 1, in which the converting means comprises a pressure wave generator through which the fluid drawn from the source passes to generate pressure waves, the flow rate through the pressure wave generator being in part directly related to the absolute pressure in the intake system.

8. The combination of claim 1, in which the controlling means comprises a vacuum-operated, valve through which the drawn fluid passes, the valve opening above a predetermined absolute pressure in the intake system representing acceleration, closing below the predetermined absolute pressure, and having a bleed orifice through which a small amount of the fluid flows when it is closed.

9. The combination of claim 1, in which the carburetor has a main air flow passage from the atmosphere, the combination additionally comprising means for energizing with pressure wave energy all the air passing from the atmosphere through the main air passage.

10. The combination of claim 1, in which the engine additionally has a crankcase manifold containing combustible crankcase emissions, the source of fluid is the crankcase manifold, the fluid line is a PCV line connecting the crankcase manifold to the interface between the carburetor and the intake manifold, and the valve means is a PCV valve.

* * * * *